United States Patent
Cafaro et al.

(10) Patent No.: US 12,161,251 B2
(45) Date of Patent: Dec. 10, 2024

(54) MULTI-USE BEVERAGE SYSTEM

(71) Applicant: BEDFORD SYSTEMS LLC, Bedford, MA (US)

(72) Inventors: Enrico Cafaro, Beverly, MA (US); Nathaniel Davis, Boston, MA (US); Linda Marie Donoghue, Boston, MA (US); Thomas Fedorka, Billerica, MA (US); Catherine Fox, Boston, MA (US); Patrick Lazatin, Woburn, MA (US); William Roger Mainwaring-Burton, Cambridge, MA (US); Michael M. Martin, Mill Valley, CA (US); Bob McCall, Boston, MA (US); Thomas J. Novak, Stowe, VT (US); Ian Scott Rice, Framingham, MA (US); Thomas Adam Sullivan, Boston, MA (US); Bryan Ellis Wagenknecht, Boston, MA (US); Barry Wood, Norwood, MA (US)

(73) Assignee: Bedford Systems LLC, Bedford, MA (US)

( * ) Notice: Subject to any disclaimer, the term of this patent is extended or adjusted under 35 U.S.C. 154(b) by 1021 days.

(21) Appl. No.: 16/678,985

(22) Filed: Nov. 8, 2019

(65) Prior Publication Data

US 2020/0146500 A1    May 14, 2020

Related U.S. Application Data

(60) Provisional application No. 62/757,570, filed on Nov. 8, 2018.

(51) Int. Cl.
*A47J 31/40*        (2006.01)
*A47J 31/46*        (2006.01)
(Continued)

(52) U.S. Cl.
CPC ............ *A47J 31/407* (2013.01); *A47J 31/46* (2013.01); *B01F 23/236* (2022.01);
(Continued)

(58) Field of Classification Search
CPC ....... A47J 31/407; A47J 31/46; B01F 23/236; B01F 23/702; B01F 23/237621;
(Continued)

(56) References Cited

U.S. PATENT DOCUMENTS 5,211,974 A * 5/1993 White ...................... C09K 3/10
                                                                  215/349
5,817,082 A   10/1998 Niedospial et al.
(Continued)

FOREIGN PATENT DOCUMENTS

CN    108463425 A    8/2018
JP    2001261034 A   9/2001
(Continued)

OTHER PUBLICATIONS

International Search Report and Written Opinion for International Application No. PCT/US2019/060612 dated Jan. 27, 2020.
(Continued)

*Primary Examiner* — Helena Kosanovic
*Assistant Examiner* — Thao Uyen Tran-Le
(74) *Attorney, Agent, or Firm* — Dorsey & Whitney LLP

(57) ABSTRACT

Described herein is a beverage system that is configured to produce beverages having different characteristics, such as different levels of carbonation including producing substantially non-carbonated beverages and carbonated beverages with a single machine. The beverage system includes a beverage appliance and a beverage container. The beverage container includes a beverage material, which can include a flavoring ingredient for a target beverage. The beverage appliance is used to access the beverage material from the
(Continued)

beverage container and produce the target beverage. The beverage appliance and beverage container are adaptable to produce the target beverage having any of a range of carbonation levels or other characteristics.

19 Claims, 16 Drawing Sheets

(51) Int. Cl.
| | |
|---|---|
| *B01F 23/236* | (2022.01) |
| *B01F 23/70* | (2022.01) |
| *B65D 81/30* | (2006.01) |
| *B65D 85/804* | (2006.01) |
| *B67D 1/00* | (2006.01) |
| *B67D 1/08* | (2006.01) |
| *C12C 11/11* | (2019.01) |
| *B01F 23/237* | (2022.01) |
| *B01F 101/14* | (2022.01) |
| *B01F 101/16* | (2022.01) |

(52) U.S. Cl.
CPC ............ *B01F 23/702* (2022.01); *B65D 81/30* (2013.01); *B65D 85/8043* (2013.01); *B67D 1/0021* (2013.01); *B67D 1/0801* (2013.01); *B67D 1/0869* (2013.01); *C12C 11/11* (2013.01); *B01F 23/237621* (2022.01); *B01F 2101/14* (2022.01); *B01F 2101/16* (2022.01)

(58) Field of Classification Search
CPC ............. B01F 2101/14; B01F 2101/16; B01F 23/2361; B01F 23/2363; B01F 25/31423; B01F 35/7137; B65D 81/30; B65D 51/224; B65D 85/8043; C12C 11/11; B67D 1/0044; B67D 1/005; B67D 1/0061; B67D 1/0075; B67D 1/0406; B67D 1/0418; B67D 1/0804; B67D 1/0809; B67D 1/127; B67D 1/0078; B67D 1/0857; B67D 2001/0091; B67D 2001/0811; B67D 2001/0821; B67D 1/0021; B67D 1/0801; B67D 1/0869; B67D 2001/0812
See application file for complete search history.

(56) References Cited

U.S. PATENT DOCUMENTS

| | | | | |
|---|---|---|---|---|
| 6,401,981 | B1 * | 6/2002 | McCann | B67D 1/0052 239/DIG. 19 |
| 8,586,117 | B2 * | 11/2013 | Vastardis | A23L 2/54 426/429 |
| 2002/0037377 | A1 * | 3/2002 | Schmidt | B32B 27/34 428/35.8 |
| 2005/0177086 | A1 * | 8/2005 | Murata | A61F 13/0203 602/41 |
| 2011/0226343 | A1 * | 9/2011 | Novak | B01F 23/2362 99/323.2 |
| 2012/0283366 | A1 * | 11/2012 | Akkapeddi | C08L 67/02 524/89 |
| 2014/0331868 | A1 * | 11/2014 | Novak | B65D 85/73 99/323.2 |
| 2015/0050392 | A1 | 2/2015 | Stonehouse et al. | |
| 2015/0203285 | A1 * | 7/2015 | Baldo | A47J 31/407 426/112 |
| 2015/0225221 | A1 | 8/2015 | Wilder et al. | |
| 2015/0246768 | A1 * | 9/2015 | Talon | A47J 31/002 426/431 |
| 2016/0109175 | A1 * | 4/2016 | Mackey | F28D 1/06 62/3.64 |
| 2016/0222331 | A1 * | 8/2016 | Peirsman | B67D 1/0021 |
| 2016/0230133 | A1 * | 8/2016 | Peterson | C12C 11/11 |
| 2016/0280527 | A1 * | 9/2016 | Griscik | B67D 1/0872 |
| 2017/0043992 | A1 * | 2/2017 | Green | B67D 1/0864 |
| 2017/0280750 | A1 | 10/2017 | Arnaud et al. | |
| 2017/0305733 | A1 * | 10/2017 | Walker | B67D 1/0079 |
| 2019/0031485 | A1 * | 1/2019 | Kruger | B67D 1/0043 |

FOREIGN PATENT DOCUMENTS

| | | | | |
|---|---|---|---|---|
| JP | | 2007230200 A | 9/2007 | |
| JP | | 2007245492 A | 9/2007 | |
| JP | | 2018000164 A * | 1/2018 | |
| WO | WO-2015151868 A1 * | 10/2015 | ............ B01F 15/065 |
| WO | | 2017046029 A1 | 3/2017 | |
| WO | | 2017167865 A1 | 10/2017 | |
| WO | | 2018102771 A1 | 6/2018 | |
| WO | | 2018182999 A1 | 10/2018 | |

OTHER PUBLICATIONS

Extended European Search Report for EP Application No. 19883150.5 dated Feb. 3, 223.

* cited by examiner

MULTI-USE BEVERAGE SYSTEM

CROSS-REFERENCE TO RELATED APPLICATIONS

This patent application is a non-provisional patent application of, and claims priority to, U.S. Provisional Application No. 62/757,570 filed Nov. 8, 2018, and titled "MULTI-USE BEVERAGE SYSTEM", the disclosure of which is hereby incorporated by reference in its entirety.

FIELD

The described embodiments relate generally to a beverage dispensing system, and more particularly, to systems and techniques for producing multiple beverage types from a single dispensing system.

BACKGROUND

Self-serve appliances can be used to prepare beverages for a user. In many traditional systems, a user inserts a cartridge or capsule containing a powder or liquid substance, which can contain a target flavoring. The appliance can open the cartridge or capsule and combine the flavoring with water, to generate a desired beverage. Many traditional systems suffer from significant drawbacks that affect the variety of beverages that are producible by the appliance. As such, the need continues for systems and techniques to facilitate production of beverages having disparate characteristics.

SUMMARY

Embodiments of the present invention are directed to a beverage system. The beverage system can be used to produce a variety of different beverages, such as a beverage having different carbonation levels. This can include providing a substantially non-carbonated beverage and/or a substantially carbonated beverage. To facilitate the foregoing, the beverage systems described herein generally include a beverage appliance and a beverage container. The beverage container includes a beverage material, such as a concentrate (which can be, but is not necessarily carbonated), that is used to produce a beverage. The beverage appliance operates to access the beverage material from the beverage container and produce a beverage. Sample beverages includes carbonated and substantially non-carbonated beverages. This allows the beverage system to produce beer, wine, cider, seltzer, juice, cocktails, and any of a variety of other beverages which can have a selective or controlled volume of carbonation in the final end-use beverage. Systems, devices, and techniques described herein facilitate a multi-use beverage system that is used to produce such a wide variety of beverages.

For example, according to one example, a beverage system is disclosed. The beverage system includes a beverage container having a beverage material sealed therein. The beverage container is configured to shield the beverage material from light ingress. The beverage system further includes a beverage appliance configured to receive the beverage container and produce a beverage from the beverage material. The beverage appliance includes a chilled precursor supply and a dispensing assembly. The dispensing assembly is configured to combine the beverage material with the chilled precursor supply. The beverage appliance further includes a pressurized gas supply selectively combinable with the beverage material to produce the beverage as one of a carbonated beverage or a substantially non-carbonated beverage.

In another embodiment, the beverage produced by the beverage appliance can have a target carbonation level of between substantially 0 volumes of $CO_2$ and 5 volumes of $CO_2$. The beverage appliance can be configured to introduce pressurized gas into the chilled precursor supply based on the target carbonation level.

In another embodiment, the dispensing assembly can define a first outlet fluidically coupled with the beverage material. The dispensing assembly can further define a second outlet adjacent the first outlet and fluidically coupled with the chilled precursor supply. The first outlet and the second outlet can cooperate to combine the beverage material and the chilled precursor supply downstream of a dispensing end of the dispensing assembly. In some examples, a portion of the dispensing end is configured to contact an end-use beverage receptacle. The first outlet and the second outlet can be arranged to form an internal stream of the beverage material. The first outlet and the second outlet can further be arranged to form an annular stream of the precursor material at least partially surrounding the internal stream.

In another embodiment, the beverage appliance further includes a cooling system. The chilled precursor supply can be maintained at a temperature below an ambient temperature by the cooling system. Further, the beverage container can include an opaque layer substantially surrounding the sealed beverage material. The opaque layer can define a pressure barrier between the beverage material and an external environment. The pressure barrier can be configured to resist oxygen ingress up to a pressure differential of 40 psi between an internal space of the beverage container and the external environment.

In another embodiment, the opaque layer can be adapted to block light ingress into the beverage container for light waves substantially within a range of 300 nm to 500 nm. Additionally or alternatively, the beverage container can include an oxygen seal adapted to seal the beverage material therein over a period of at least 6 months, of at least 1 year, of at least 2 years, or of at least 5 years. In some cases, the oxygen seal can be adapted to maintain a pressure differential of up to 40 psi between an internal space of the beverage container and an external environment during the period. Further, the oxygen seal can be adapted to limit oxygen ingress into the internal space during the period to about 1 to 2 ppb of oxygen per day. In this regard, the oxygen seal can operate to limit a cumulative oxygen ingress value to less than 180 ppb of oxygen.

In another embodiment, a beverage system is disclosed. The beverage system includes a beverage container having a sealed region encompassing a beverage material within a pressurized internal space. The sealed region is configured to maintain the beverage material in the pressurized internal space, even in response to exposure to direct sunlight. The beverage system further includes a beverage appliance configured to receive the beverage container and produce a substantially non-carbonated beverage or a carbonated beverage from the beverage material. The beverage appliance further includes a precursor supply and a cooling system. The cooling system is configured to remove heat from the precursor supply and maintain the precursor supply above a freezing temperature.

In another embodiment, the beverage appliance can further include a pressurized gas supply fluidically coupled with the precursor supply. The beverage appliance can further include a dispensing assembly configured to combine the precursor supply and the beverage material, thereby forming the beverage. In some cases, the beverage appliance can be configured to operate in various modes. For example, the beverage appliance can be configured to, in response to a receipt of a beverage container having a beverage material for the carbonated beverage, carbonate the precursor supply with the pressurized gas supply. Further, the beverage appliance can be configured to, in response to a receipt of a beverage container having a beverage material for the substantially non-carbonated beverage, shield the precursor supply from the pressurized gas supply.

In another embodiment, the dispensing assembly can include a dispensing end having a first outlet fluidically coupled with the beverage material. The dispensing assembly can further include a wall defining an annular second outlet around the dispensing end, the annular second outlet fluidically coupled with the precursor supply. The dispensing end can extend away from the annular wall, and as such, can be configured for engagement with an end-use beverage receptacle.

In another embodiment, the cooling system can include a sensor configured to detect a parameter of the precursor supply. The cooling system can be further configured to remove heat from the precursor supply when the parameter satisfies a threshold condition. In some cases, the cooling system can include at least one of: (i) a fan, (ii) a heat sink, (iii) heat pipes, or (iv) a thermoelectric device.

In another embodiment, the beverage container has a burst resistance of up to 40 psi. In some cases, the beverage container can include an opaque barrier layer configured to impede direct sunlight that is substantially within a range of 350 nm to 500 nm from reaching the beverage material.

In another embodiment, a method of producing beverages from multiple beverage containers is disclosed. Each of the multiple beverage containers has a beverage material. The method includes a first step of associating a first beverage container of the multiple beverage containers with a beverage appliance. The method further includes a second step of accessing a beverage material of the first beverage container using the beverage appliance. The method further includes a third step of selectively introducing a pressurized gas into a chilled precursor supply. The method further includes a fourth step of mixing the beverage material with the chilled precursor supply, thereby producing a first beverage. The method further includes a fifth step of producing a second beverage by repeating step 1 through step 4 for a second beverage container of the multiple beverage containers. The first beverage includes a carbonated beverage and the second beverage includes the non-carbonated beverage.

In another embodiment, the first beverage can include a beer and the second beverage can include a cocktail.

In another embodiment, the operation of mixing can be performed using a dispensing assembly. In this regard, the dispensing assembly can include a dispensing end configured for engagement with an end-use receptacle. The dispensing end can have a first outlet for dispensing the beverage material. The dispensing assembly can further have an annular wall around the dispensing end that defines an annular second outlet for dispensing the chilled precursor supply. In some cases, the operation of mixing the beverage material with the chilled precursor supply can include converging the beverage material dispensed from the first outlet and the chilled precursor liquid dispensed from the second outlet downstream of the dispensing end.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
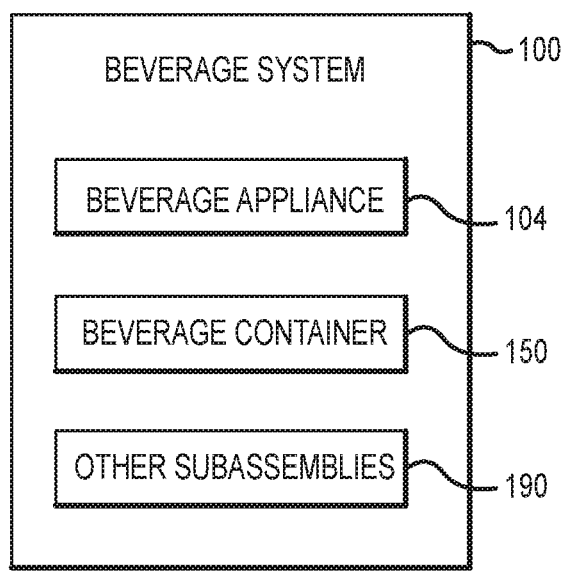
FIG. 1A depicts a functional block diagram of a beverage system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure can be practiced in a variety of forms in addition to those described herein.

The present disclosure describes systems, devices, and techniques related beverage systems and carbonated beverage production. A beverage system generally includes a beverage appliance and a beverage pod or container. The beverage container includes a beverage material that is used by the beverage appliance to produce a desired beverage, often a single serving. The beverage material can include, but is not limited to, certain powdered drink mixes, syrups, liquid mixes, concentrates, and so on, that are used by a beverage appliance to produce a desired beverage, such as a single serving coffee, tea, soda, seltzer, alcohol, and so on. In this manner, the desired beverage can include any of a range of carbonation levels, from a substantially noncarbonated coffee beverage to a soda, seltzer, or beer with a relatively high level of carbonation. However, each individual beverage can require particular processing conditions and inputs (e.g., flavors, pressures, carbonation levels, chilling, and so on) to produce the beverage to specification and user taste.

The beverage system of the present disclosure can mitigate such hindrances, thereby allowing for repeated, single-serve beverage production for any of a variety of beverages. The beverage system thus provides an adaptable and integrated approach that can produce beverages having different requirements. In one example, the beverage system is adaptable to produce a range of beverages having differing carbonation levels. The beverage system can include or accept beverage material for producing a substantially non-carbonated beverage or a substantially carbonated beverage. In turn, the beverage system can selectively introduce a pressurized gas into a precursor supply or other medium in order to carbonate the beverage material to a target level.

Disclosed herein are systems and techniques that facilitate the multi-use, multiple-beverage-type production of the beverage system. To facilitate the foregoing, the beverage system includes a beverage container that holds the beverage material in a sealed internal volume. The beverage container defines a shield encompassing the beverage that substantially prevents or light and oxygen ingress. For example, the beverage container can substantially block light within a range of 350 nm to 500 nm from reaching an interior of the container that holds the beverage material therein. In this regard, the beverage container can block UV-B light and/or other light in order to reduce the likelihood of spoilage of the beverage material. Beer, as an illustration, can be sensitive to UV-B light exposure, and thus the beverage container described herein can substantially block UV-B from reaching beverage materials that are used to form a beer, thereby enhancing the quality of the end beer product. Other beverage materials can also be sensitive to UV-B light exposure, and the beverage container can provide protection for those beverage materials too, thus providing an adaptable solution to producing multiple beverages and beverage types with a single machine and standardized beverage container.

The barrier material, or other structure of the beverage container, can also define an air-tight barrier encompassing the beverage material. This can allow the beverage material to be held under pressure within the beverage container. For example, the beverage material can be partially carbonated, and the beverage container can maintain the carbonation within the sealed volume. For substantially non-carbonated and carbonated beverages alike, the beverage container can employ an oxygen seal to help mitigate the impact of oxygen intrusion into an internal space of the beverage container that holds the beverage material therein. The oxygen seal can help enhance the shelf life of the beverage material, including helping to maintain the beverage material sealed therein over a period of at least 6 months, of at least 1 year, of at least 2 years, or of at least 5 years. Additionally or alternatively, the oxygen seal can be adapted to maintain a pressure differential of up to 40 psi between the internal space of the beverage container and an external environment during the period or shelf life. At and up to the 40 psi pressure differential, the oxygen seal can therefore limit oxygen ingress into the sealed internal space of the container to about 1 to 2 ppb per day. In some cases, this can include limiting the cumulative oxygen ingress during the period to 0 ppb, 10 ppb, 100 ppb, 150 ppb, or 180 ppb, as may be appropriate for a given application.

The light and oxygen blocking properties of the beverage container can facilitate use of the beverage container with a variety of concentrates, mixes, powders, syrups, and so on. For example, in one case, a first beverage container can be used to enclose a beverage material for a substantially non-carbonated juice, whereas a second beverage container can be used to enclose a beverage material for a substantially high-carbonation beer product. Despite having different beverage materials, the first and second beverage containers can have substantially the same construction, and thus are interchangeable with a common beverage appliance. Such beverage appliance, as described herein, can thus be adaptable to transition between producing the substantially non-carbonated beverage of the first beverage container and the substantially high-carbonation beverage of the second beverage container.

While the beverage containers of the present disclosure can have a variety of constructions, in a particular example, the container includes a body and an enclosure. The body can be a vessel or other storage structure that defines an internal space configured to receive and hold the beverage material. The enclosure (or "closure" more broadly) can be a cap, fitting, shield, and so on, that covers a sealed region of the body that prevents the beverage material from exiting the internal space. The sealed region of the body can be an opening (used to introduce the beverage material into the internal space during manufacture) that is sealed by a membrane or other like structure. The enclosure fits over the membrane and forms an interface of the beverage container for the beverage machine or appliance.

The enclosure also includes a structure, assembly, component or the like that operates to pierce the membrane and allow the beverage machine to access the beverage material sealed within. To facilitate the foregoing, the enclosure includes a moveable element having at least one piercing feature and/or other puncture mechanism. The moveable element is configured for engagement by the beverage machine and operated to advance the piercing feature toward the membrane. For example, as described herein, the beverage machine can include an anvil or other structure that causes the moveable element to move toward the membrane. As such, the piercing feature can be advanced toward the membrane and form one or more holes through the membrane, thereby releasing the beverage material. The enclosure or other component of the beverage container can include various paths that direct the released beverage material into an internal process of the beverage machine that uses the beverage material in the production of a single serving beverage.

By including the mechanism that punctures the membrane or other seal within the beverage container itself, the possibility of cross-contamination is reduced. This can facilitate sequential processing of beverage containers having distinct beverage materials by a beverage appliance of the beverage system. Continuing the above illustration, the first beverage container having the beverage material for the substantially non-carbonated beverage can be accessed using a piercing structure integrated within the first beverage container. Similarly, the second beverage container having the beverage material for the substantially high-carbonation beer product can be accessed using a piercing structure integrated within the second beverage container. Each piercing structure is therefore specifically associated with the beverage material of the respective beverage container, thus reducing the likelihood of introducing contaminants (e.g., other beverage materials) through a sealed region during piercing. This helps further facilitate the multi-use beverage production of the beverage system, for example, where it can be undesirable to combine beverage materials for substantially non-carbonated beverages with beverage materials for substantially high-carbonation products, such as beer.

In addition to the structures and techniques of the beverage container, disclosed herein is a beverage appliance that is used to produce beverages having a variety of characteristics. For example, a beverage appliance is disclosed herein that operates to access beverage material from a beverage container of the present disclosure and produce a target beverage. The target beverage can have a range of carbonation levels. In this manner and continuing the foregoing illustration, the appliance can be operable to sequentially receive the first beverage container having the beverage material for the substantially non-carbonated beverage and the second beverage container having the beverage material for the substantially high-carbonation beer product. The beverage appliance is generally operable to selectively carbonate the target beverage. As such, in response to receipt of the first beverage container, the appliance can shield or limit pressurized gas from introduction into one or more flows used to produce the substantially non-carbonated beverage. Further, in response to receipt of the second beverage container, the appliance can carbonate one or more flows in order to produce the substantially carbonated beverage. The appliance can tune the flow of the pressurized gas in order to produce a beverage having a predetermined carbonation level, such as a beverage having a carbonation level within the range of substantially zero volumes of $CO_2$ to 5 volumes of $CO_2$.

To facilitate the foregoing, the beverage appliance can include a variety of subsystems and processes. Broadly, the beverage appliance includes a container holder assembly that receives the beverage container. The container holder can include an anvil or other structure that is advanceable toward the moveable component (and piercing feature) of the received beverage container. Movement of the anvil in this regard can cause the piercing feature to advance at least partially into a membrane or other sealed region of the beverage container, thereby allowing for release of the beverage material.

The beverage appliance also includes a precursor supply, such as water, which can be filtered. Generally, the precursor liquid is mixed with the beverage material in order to form the target beverage. The beverage appliance also includes a pressurized gas supply. The pressurized gas supply can be used to selectively carbonate the precursor supply. In this regard, when the beverage material is for production of a substantially high-carbonation beverage, the pressurized gas can increase a carbonation level of the precursor supply correspondingly. And when the beverage material is for production of a substantially non-carbonated beverage, the beverage appliance can operate to shield the precursor supply from the pressurized gas, thereby reducing a carbonation level of the final beverage product. The precursor supply can be chilled, for example by one or more chilling systems of the appliance, in order to facilitate carbonation and produce a beverage at a target temperature.

In order to facilitate production of multiple, distinct beverages, the beverage appliance can mix the precursor supply and the beverage material before delivery into an end-use beverage receptacle, such as a beer mug, stein, or other open container. For example, the beverage appliance can include a mixing assembly that channels the precursor supply (carbonated or non-carbonated) and the beverage material toward a dispensing end of a nozzle. The nozzle can include at least a first outlet for exit of the beverage material and a second outlet for exit of the precursor supply. The first outlet and the second outlet can be arranged so that the beverage material defines an internal stream at the dispensing end and the precursor supply defines an annular stream substantially surrounding the beverage material stream. This can allow for an appropriate mixing of the beverage material and precursor supply immediately prior to entering the end-use beverage receptacle.

While the nozzle and mixing assemblies more generally can be defined by a variety of constructions, the beverage appliance is configured to mix beverage material with both a substantially non-carbonated precursor supply and a carbonated precursor supply. The carbonated precursor supply can exhibit a carbonation at any of a variety of carbonation levels, based on the characteristics of the target beverage. The nozzle is therefore tuned to introduce the precursor supply into the beverage material in a manner that causes the resulting beverage product to exhibit the intended carbonation level. Subsequently, the beverage appliance is adaptable to mixing beverages of different carbonation levels, limiting the need to interchange parts, components, and so on, of the beverage appliance for each intended beverage.

It will be appreciated that while sample components, subsystems, apparatuses, containers, and so on, are depicted for purposes of illustration, the beverage system of the present disclosure can include any of a variety of components to facilitate the functions described herein. The beverage system provides an adaptable solution that produces beverages having a range of characteristics, such as a range of carbonation levels. As such, it will be appreciated that the various modules and sample mechanical components presented herein can be used to facilitate the multi-function beverage system operations, rather than be construed as limiting to a particular example.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

Figure 1B:
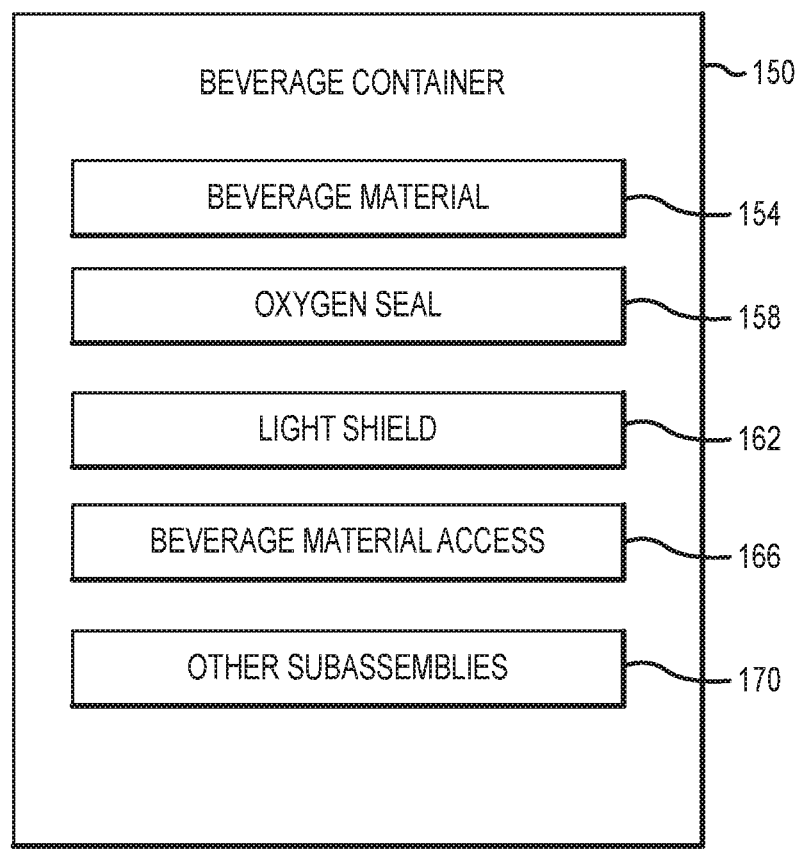
FIG. 1B depicts a functional block diagram of a beverage container.
Figure 1C:
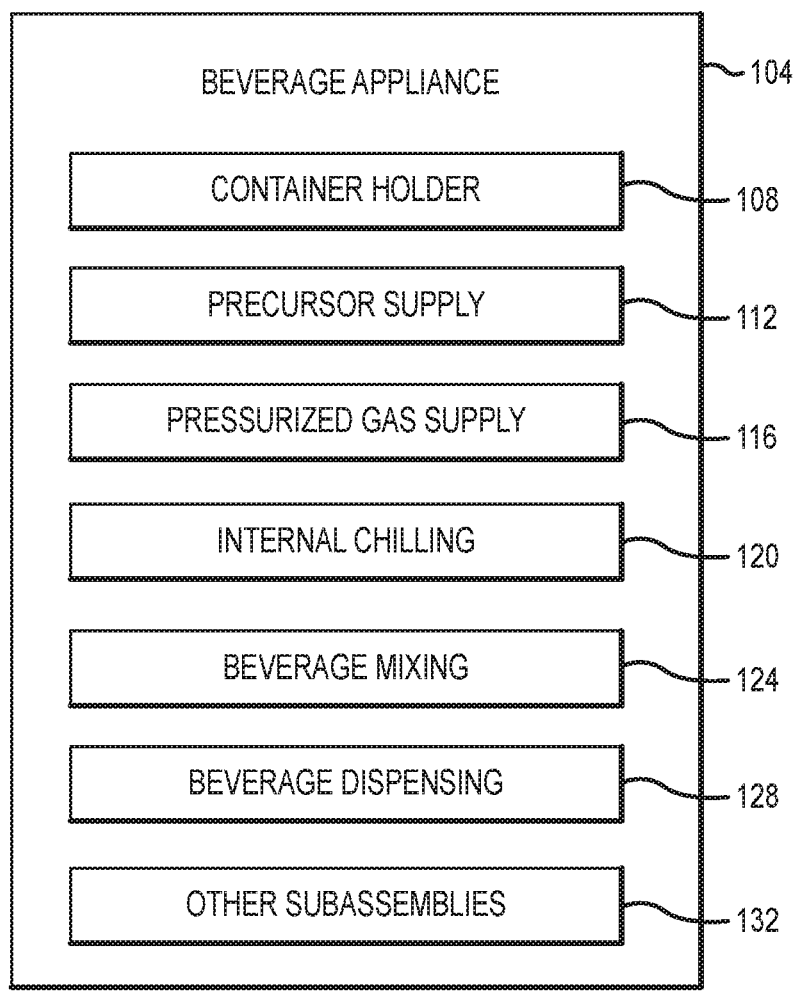
FIG. 1C depicts a functional block diagram of a beverage appliance.

FIGS. 1A-1C depict functional block diagrams of various modules of a beverage system and associated subsystems, according to the examples described herein. Each respective module can include a collection of mechanical components, instruments, ingredients, flow, materials, and so on, to facilitate the functions of the appropriate modules described in FIGS. 1A-1C. Rather than define discrete or separated mechanical components, instruments, and so on, it will be appreciated that the modules can use common or overlapping features to perform the functions described herein. Accordingly, the various modules described with respect to FIGS. 1A-1C are used to facilitate an understanding of the beverage system of the present disclosure, and are not meant as not meant as limiting or demarcating a specific component as performing isolated functions. In this regard, while sample structures of the modules are described in FIGS. 2-13 as one possible implementation of the beverage system, other configurations are possible and contemplated herein.

With reference to FIG. 1A, a beverage system 100 is shown, such as the beverage system discussed above and described in greater detail below. The beverage system 100 can be configured to produce a variety of beverages. For example, the beverage system 100 can be configured to produce beverages having different characteristics and/or requiring substantially different inputs or processing requirements for beverage formation. This can include beverages having a range of carbonation levels. The beverage system 100 can thus be configured to produce a beverage having a substantially low carbonation level (e.g., substantially non-carbonated), including certain juices, wines, teas, and so on. The beverage system 100 can also be configured to produce a beverage having a substantially high level of carbonation, including sodas, seltzers, beers, and so on.

The beverages having different characteristics (e.g., different carbonation levels) can be produced by a single machine or appliance that is adaptable to the requirements of a target beverage. In this manner, FIG. 1A shows the beverage system 100 including a beverage appliance 104. The beverage appliance 104 can be a multi-use beverage production machine, in that the beverage appliance 104 is generally operable to produce a variety of different beverage types, as described herein. In order to produce a beverage, the beverage appliance 104 can access a beverage material, such as various powdered drink mixes, syrups, liquid mixes, concentrates from a beverage container, such as the beverage container 150 of the beverage system 100 of FIG. 1A.

As described in greater detail below, the beverage appliance 104 generally receives the beverage container 150 and accesses beverage material sealed therein. The beverage appliance 104 includes various subsystems that operate to mix the beverage material with a precursor supply in order to form a target beverage. The precursor supply can be selectively carbonated by a pressurized gas supply of the beverage appliance 104 based on the target carbonation level of the beverage. The precursor supply is often chilled to a specified temperature in order to facilitate carbonation and beverage production to a desired temperature. The beverage appliance mixes the precursor supply and beverage material and dispensing the mixture into an end-use receptacle.

While the beverage system 100 shown in FIG. 1A includes a single beverage container 150. It will be appreciated that the beverage system 100 can include multiple different beverage containers, each of which can have a distinct beverage materials contained therein. For example, a first beverage container can include a beverage material for a substantially non-carbonated beverage, whereas a second beverage container can include a beverage material for a substantially high-carbonation beverage, such as a high-carbonation beer product. The first beverage container, the second beverage container, or any beverage containers of the present disclosure can be sequentially received by the beverage appliance 104 and the beverage appliance 104 can be equipped to produce a target beverage from the beverage material of the respective beverage container. For example, each of the beverage containers can have a common construction or form, and thus be receivable by a single receiving feature or structure of the beverage appliance 104. The common construction or form of the beverage containers can also help mass produce containers that are each equipped to enclosure any of a variety of beverage materials (such as beverage materials for substantially non-carbonated beverages and beverage materials for substantially carbonated beverages). As such, both the beverage appliance 104 and the beverage container 150 cooperate to establish a multi-use system capable of producing beverages, often single serving, having different characteristics, mitigating the need for different machines and cumbersome interfaces.

FIG. 1A can also include other subsystems 190. Other subsystems 190 can include components that facilitate use of the beverage appliance 104 in forming multiple different beverages. This can include power systems, such as charging systems, batteries, power cords, and so forth that connect the beverage appliance 104 to a power source or otherwise operate to provide electrical power. Additionally or alternatively, the other subsystems 190 can also include feed lines that facilitate providing a precursor supply, pressurized gas supply, or other fluidic supply to the beverage appliance 104. For example, while the beverage appliance 104 generally includes an internal storage (e.g., a reservoir) for a precursor supply and pressurized gas, in other cases, it can be desirable to connect the beverage appliance 104 to an external source. Other subsystems 190 can also include certain product packaging configurations, such as product packaging that encloses both the beverage appliance 104 and the beverage container 150 for shipping and sale. In other cases, other subsystems can be included.

With reference to FIG. 1B, a functional block diagram of the beverage container 150 of FIG. 1A is shown. As described herein, the beverage container 150 encloses a beverage material in a sealed internal volume. Within the sealed internal volume, the beverage material is shielded from light and oxygen ingress, thereby helping preserve the beverage material. The beverage container also includes an assembly that is able to be manipulated by the beverage appliance 104 in order to release the beverage material from the sealed environment.

To facilitate the foregoing, in the example of FIG. 1B, the beverage container 150 is shown as including a beverage material 154. The beverage material 154 can be one or more of powdered drink mixes, syrups, liquid mixes, concentrates, and so on. More generally, the beverage material 154 can provide flavoring to a precursor supply (of the beverage appliance 104). In this manner, the beverage material 154 can be any appropriate flavor to produce a desired beverage, such as flavors for producing coffees, teas, sodas, seltzers, wines, beers, and so on, of various types and varieties. Alcohol can thus be present (at various concentrations) based on the type of target beverage. In some cases, the beverage material 154 can have an initial level of carbonation, or otherwise be under pressure within the beverage container 150. This can facilitate release of the beverage material 154 when the beverage container 150 is manipulated by the beverage appliance 104. Initial carbonation in the beverage material 154 sealed within the beverage container 150 can also be desirable to produce a beverage having a particular taste or texture.

The beverage material 154 can be held at a sealed internal volume. To facilitate the foregoing, the beverage container 150 includes an oxygen seal 158. The oxygen seal 158 can generally define an air-tight or air-impermeable region encompassing the beverage material 154. The oxygen seal 158 can include multiple components of the beverage container 150. For example, a substantially rigid body of the beverage container 150 can hold the beverage material 154 and define an opening. The oxygen seal 158 can further include a membrane positioned over the opening, enclosing the beverage material 154 within the substantially rigid body. The beverage container 150 can include other components that facilitate forming an air-tight seal, such as various gaskets, food-grade adhesives, films, and so on.

Broadly, the features of the oxygen seal 158 can cooperate the prevent air ingress to the beverage material 154. The oxygen seal 158 also prevents air within the beverage container 150 and/or the beverage material 154 from exiting. The beverage material 154 can be carbonated or otherwise stored in the beverage container 150 under pressure. As such, the oxygen seal 158 can maintain the internal volume of the beverage container 150 at the pressurized level. The beverage container 150 can be exposed to external conditions that increase an internal pressure with the container, such as exposure to direction sunlight or other heat sources. The oxygen seal 158 generally maintains the seal of the beverage material up to a burst resistance of 40 psi. In some cases, the oxygen seal 158 can be configured for a burst resistance of less than 40 psi, such as less than 30 psi, or greater than 40 psi, such as greater than 50 psi, as can be appropriate for a given application.

The oxygen seal 158 also operates to mitigate oxygen ingress into the beverage container 150 after the beverage material 154 is sealed therein. For example, the oxygen seal 158 can allow the beverage material 154 to be sealed within the beverage container 150 for a period of at least 6 months, of at least 1 year, or at least 2 years, or of at least 5 years. During the period, the oxygen seal 158 can maintain the pressure differential between the interior of the beverage container 150 and an external environment of up to 40 psi, for example. Further, the oxygen seal 158 can operate to limit the oxygen ingress into the internal space during the period to, in some cases, 1 ppb to 2 ppb of oxygen per day. In this regard, the cumulative oxygen ingress into the beverage container 150 can be reduce to a value as low as 180 ppb, 150 ppb, 100 ppb, 50 ppb, 10 ppb, or substantially 0 ppb.

The beverage material 154 can also be sensitive to light. For example, certain concentrates and solutions used to produce beer can deteriorate or otherwise change properties if exposed to prolonged radiation. The beverage container 150 of FIG. 1B includes a light shield 162. The light shield 162 generally operates to prevent or mitigate light ingress to the beverage material 154 sealed within the beverage container 150. The light shield 162 can as such include one or more opaque layers that prevents or mitigates the propagation of light there through. In some cases, the opaque layers can be reflective. For example, the light shield 162 can include one or more layers to limit light intrusion into the beverage container that is substantially within a range of 300 nm to 500 nm.

It will be appreciated that the light shield 162 can be established by a variety of structures that block all or some of the light around the beverage material 154. For example, the light shield 162 can be substantially defined by a rigid body or vessel that holds the beverage material 154. This can be the case when the vessel itself is formed from an opaque material, such as certain plastics or ceramics. Additionally or alternatively, the light shield 162 can be defined by another layer, such as a barrier layer or wrapper that surrounds the vessel. In some cases, the light shield 162 can include internal layers as well. In this regard, the light shield 162 can encompass a multi-layer assembly that operates to block light from reaching the beverage material 154. The light shield 162 can include materials that maintain resistance to light in a variety of conditions. For example, the light shield 162 can continue to prevent or mitigate light ingress up to internal pressures within the beverage container of 40 psi. The light shield 162 can also include materials that maintain resistance to light when exposed to handing forces associated with handling the beverage container 150, such as holding, inserting into a receiving feature or rack, and in some cases dropping the beverage container 150 from a working height.

The oxygen seal 158 and the light shield 162 can cooperate to help seal the beverage material 154 from an external environment. In operation, the beverage material 154 is releasable from the sealed environment of the beverage container 154 in order to form a target beverage. In this manner, the beverage container 150 includes a beverage material access 166, shown in FIG. 1B. The beverage material access 166 generally includes a collection of components that operate to release the beverage material 154 from the sealed internal volume when manipulated by a beverage appliance. The beverage material access 166 thus provides a mechanism substantially internal to the beverage container 150 for rupturing, piercing, or otherwise forming a hole or conduit into the sealed volume of the beverage container 150. This reduces or removes the need to include such component within the beverage appliance 104 or other device that is used to manipulate the beverage container 150.

In one instance, beverage material access 166 can include a piercing element that is moveable by the beverage appliance 104. For example, the piercing element can be an elongated structure connected to a moveable portion of the beverage container 150. The beverage appliance 104 can be operable to manipulate the moveable portion of the beverage container 150 and advance the piercing element at least partially into the sealed region of the beverage container 150. In some cases, this can involve at least partially advancing the piercing element at least partially through a membrane, as described herein. The piercing element can define one or more fluidic passages for accessing the beverage material 154. And as the piercing element, or beverage material access 166 more generally is specific to the beverage container 150, the likelihood of cross-contamination, such as from other types of beverage materials, is reduced.

The beverage container 150 shown in FIG. 1B also includes other subassemblies 170. The other subassemblies 170 can include other systems and components that are used to seal the beverage material 154 and provide access to the beverage material 154 by the operation of the beverage appliance 104. Sample components can include labeling features, such as RFID tags, stamps, etchings, marking, and so on. Labeling in this regard can include information associated with the content of the beverage material 154 container therein. For example, such labeling can indicate a carbonation level of the target beverage associated for production with the beverage container 150. The beverage appliance 104 can include a corresponding reader or other sensors that detect or scan the labeling, and in turn, alter one or more configurations of the appliance, as described herein. The other subassemblies 170 can also include other components, including an outer protective packing (e.g., wrapping) that is removed by the user before use of the beverage container 150 with the beverage appliance 104. In other cases, the other subassemblies 170 can include other components, as can be appropriate for a given application.

With reference to FIG. 1C, a functional block diagram of the beverage appliance 104 is shown. As described herein, the beverage appliance 104 is used to access the beverage material 154 from the beverage container 150 and produce a corresponding beverage. More generally, the beverage appliance 104 can access beverage materials from any of a variety of beverage containers and produce a beverage associated with the container, notwithstanding the beverages having different characteristics, including different carbonation levels. The beverage appliance can therefore include various components to process the beverage material 154 from the beverage container 150 according to the requirements of the target beverage. This can include diluting the beverage material 154 with an appropriate base solution, carbonating the beverage material 154 (as appropriate), along with chilling, mixing, and dispensing the materials, as can be appropriate for a given application.

To facilitate the foregoing, in the example of FIG. 1C, the beverage appliance 104 is shown as including a container holder 108. The container holder 108 is a structural assembly of the beverage appliance 104 that receives the beverage container 104. In some cases, the container holder 108 can include a basket and a lid that is able to be manipulated over the basket. The basket can be configured to receive the beverage container 150. The lid can be positioned over the basket and used to form an enclosed, and optionally pressured region, about the beverage container 150. With the enclosed region of the container holder 108, the beverage container 150 can be secured by latches, clips, or other features that mitigate relative movement of the beverage container 150 with respect to the beverage appliance 104.

The container holder 108 also generally operates to access the beverage material sealed within the beverage container 150. For example, the container holder 108 can include an anvil or other structure that is used to press into the beverage container 150. The anvil can cause movement of a moveable feature of the beverage container 150. As described herein, the moveable feature of the beverage container 150 includes a pierceable feature. Upon pressing of the anvil substantially toward the beverage container 150, the piercing element can in turn rupture a sealed region of the beverage container 150 including the beverage material 154. Upon rupture, the beverage material 154 can be releasable from the beverage container 150.

The container holder 108 can thus include various conduits, pipes, tubing, and related features that are used to channel the beverage material 154 from the beverage container 150 and into various processes of the beverage appliance 104 (e.g., such as those described below with respect to FIG. 13). For example, the beverage material 154 can be substantially routed from the beverage container 150 by the container holder 108 toward a precursor supply, including a chilled precursor supply, a carbonation source, and other fluids and processes in order to produce the target beverage. In this manner, the FIG. 1C also shows the beverage appliance 104 as including a precursor supply 112. The precursor supply 112 can be a water source, which can be stored in a reservoir of the beverage appliance 104. In some cases, the water source can be actively fed into the beverage appliance, for example, by a supply line.

The precursor supply 112 is used to dilute the flavoring of the beverage material 154 to an appropriate level in order to produce a target beverage. For example, the beverage material 154 can generally be a concentrate having flavoring for the target beverage and the precursor supply 112 is mixed with the beverage material 154 to produce the target beverage. In some cases, the target beverage can be an alcoholic beverage, and as such, the beverage material 154 can exhibit an alcoholic content before mixing with the precursor supply 112.

While in an initial state, the precursor supply 112 can be flat or substantially non-carbonated, the beverage appliance 104 can operate to carbonate the precursor supply 112 in order to produce a carbonated beverage. In this regard, the beverage appliance 104 shown in FIG. 1C includes a pressurized gas supply 116. The pressurized gas supply 116 can include a carbon dioxide gas, which can be stored in a vessel of canister integrated within the beverage appliance 104 and which can be removable and replaceable by a user. In some cases, the beverage appliance 104 can be actively fed a pressurized gas, for example, by a supply line or other connection mechanism associated with a gas source substantially external to the beverage appliance 104.

The pressurized gas supply 116 can generally allow for integration of pressurized gas into the precursor supply 112. The pressurized gas can be introduced selectively or at a controlled internal in order to produce a carbonated precursor supply 112 having a target carbonation level. For example, the beverage appliance 104 can determine that the beverage material 154 is for the production of a substantially non-carbonated beverage, and as such, the pressurized gas supply 116 can be substantially shielded from the precursor supply 112. In another configuration, the beverage appliance 104 can determine that the beverage material 154 is for the production of a substantially high-carbonation beverage, such as a beer, and as such, the pressurized gas supply 116 can be integrated into the precursor supply 112 at various levels. For example, the pressurized gas supply 116 can be integrated into the precursor supply 112 in order to produce a beverage product having a carbonation up to 5 volumes of $CO_2$. In other cases, the pressurized gas supply 116 can be regulated in order to produce a beverage product having a carbonation level of less than 5 volumes of $CO_2$ or more than 5 volumes of $CO_2$, as can be appropriate for a given application.

As described herein, the beverage appliance 104 is used to produce multiple beverage types, including beverages having different levels of carbonation, including producing both a substantially non-carbonated beverage and a carbonated beverage. The beverage appliance 104 can also be used to produce beverages of differing temperatures or otherwise requiring specific process temperatures for beverage formation, such as dilution by the precursor supply 112 having a temperature within a given range. Controlling the temperature can also facilitate forming the substantially non-carbonated and carbonated beverages and transitioning between producing such beverages with a single machine. In the example of FIG. 1C, the beverage appliance 104 is shown as including internal chilling 120. Broadly, the internal chilling 120 can include any collection of components that helps control and maintain a temperature of one or more fluids of the beverage appliance 104. This can include facilitating control and maintenance of a temperature of a target beverage produced by the beverage appliance 104.

In one configuration, the internal chilling 120 is used to control and maintain a temperature of the precursor supply 112. For example, the internal chilling 120 can help form a chilled precursor supply 112 that is used to dilute the beverage material 154. As beverage material 154 can be at ambient temperature, the chilled precursor supply 112 can substantially define a temperature of the final beverage product. Further, reducing the temperature of the precursor supply 112 can help the pressurized gas supply 116 partially dissolve therein, for example, when the beverage appliance 104 is engaged in producing a carbonated beverage. To facilitate the foregoing, the internal chilling 120 can include or be associated with a number of components, such as a fan, a heat sink, heat pipes, a thermoelectric device, and/or other components associated with refrigeration-type systems.

The internal chilling 120 can also include components configured to prevent ice formation and buildup within the beverage appliance 104. For example, while it can be desirable to chill the precursor supply 112, chilling to the point of freezing can hinder one or more operations of the device 104 or otherwise create undesirable results for the final beverage product. In this manner, the internal chilling 120 can include a sensor that detects one or more characteristics of the beverage appliance 104, such as a temperature of the precursor supply 112. The cooling components of the internal chilling 120 can be active control components coupled to the sensor. As such, in response to the sensor detecting a threshold value, the active chilling components can cease or reverse operation, thereby facilitating ice mitigation in the system. As an illustration, the sensor can detect a threshold condition of precursor supply 112 being within 20% of a freezing temperature. Upon detection of the threshold condition, the internal chilling 120 can cease actively cooling the precursor supply 112, allowing the precursor supply 112 to remain above the freezing temperature and avoid ice formation.

For each of the variety of carbonation levels, temperatures, and other processing conditions and requirements of a given target beverage, the beverage appliance 104 can generally produce the target beverage by combining beverage material with precursor liquid and dispensing the mixture into an end-use receptacle. In this regard, FIG. 1C shows the beverage appliance 104 including a beverage mixing module 124 and a beverage dispensing module 128.

With reference to the beverage mixing module 124, the beverage material 154 and the precursor supply 112 are combinable in order to form the target beverage. The precursor supply 112 is added to the beverage material 154 at an appropriate ratio, based on a beverage type, and beverage strength, which can include adaptations based on user preference. The precursor supply 112 can be chilled and/or carbonated, as described herein. In this manner, the beverage formed by the beverage mixing module 124 can exhibit a desired carbonation level and temperature based on the characteristics of the precursor supply 112. In some cases, this can involve introducing the precursor supply 112 into the beverage material 154 in a manner that imparts the carbonation or other characteristics of the precursor supply 112 into the beverage material 154. This can involve nozzles, and post-mixing assemblies, as described herein.

With reference to the beverage dispensing module 128, the beverage formed using the beverage mixing module 124 is dispensing from the beverage appliance 104. The target beverage is dispensed from the beverage appliance 104 and into an end-use receptacle, including various glass, mugs and so on. In some case, the beverage can be dispensing in a manner to control foam of the producing beverage upon dispensing in the end-use receptacle. For example, certain beers can exhibit a foaminess when dispensed. The beverage can be dispensed by various nozzles, spouts, outlets and the like that can be configured to contact a portion of the end-use receptacle, and thus guide the produced beverage toward a sidewall of the end-use receptacle. This can reduce the foaminess of the beer to an acceptable level, in certain examples.

It will be appreciated that while the beverage mixing module 124 and the beverage dispensing module 128 are described for purposes of illustration as separate modules, the beverage appliance 104 can implement the functionality of the respective modules in a single component of assembly. For example and as described herein with reference to FIGS. 10-12, a nozzle assembly can be used to mix the beverage material 154 and the precursor supply 112 immediately before dispensing into an end-use beverage receptacle. Such component can include substantially concentric outlets that allows the respective flows to be mixed while being dispensed from the beverage appliance 104. In other cases, the mixing of the precursor supply 112 and the beverage material 154 can occur separately (e.g., upstream) from the dispensing of the respective flows.

FIG. 1C also shows the beverage appliance 104 including other subassemblies 132. The other subassemblies 132 can be substantially any other components that facilitate the use of the beverage appliance 104 in forming multiple beverages, according to the examples described herein. Sample components of the other subassemblies 132 can include a display, which can be touch-sensitive, and other user-operable controls. Such control can detect an input of the user at the display, or other input surface of the beverage appliance 104, and cause the beverage appliance 104 to perform an associated function (e.g., initiation a beverage formation process). Additionally or alternatively, other subassemblies 132 can include certain housing components, handles, or other user engage-able structures. In other cases, other subassemblies 132 can include other appropriate components, according to the examples described herein.

FIGS. 2-13 describe sample systems and structures that can be used to implement one or more of the modules, assemblies, apparatuses, and the like described above with respect to FIGS. 1A-1C. As described herein, the functionality described with respect to FIGS. 1A-1C can be implemented in a variety of manners. In this regard, while FIGS. 2-13 show sample embodiments of the beverage system and associated components and features, FIGS. 2-13 are not meant as limiting the beverage system to the example structures shown herein.

Figure 2:
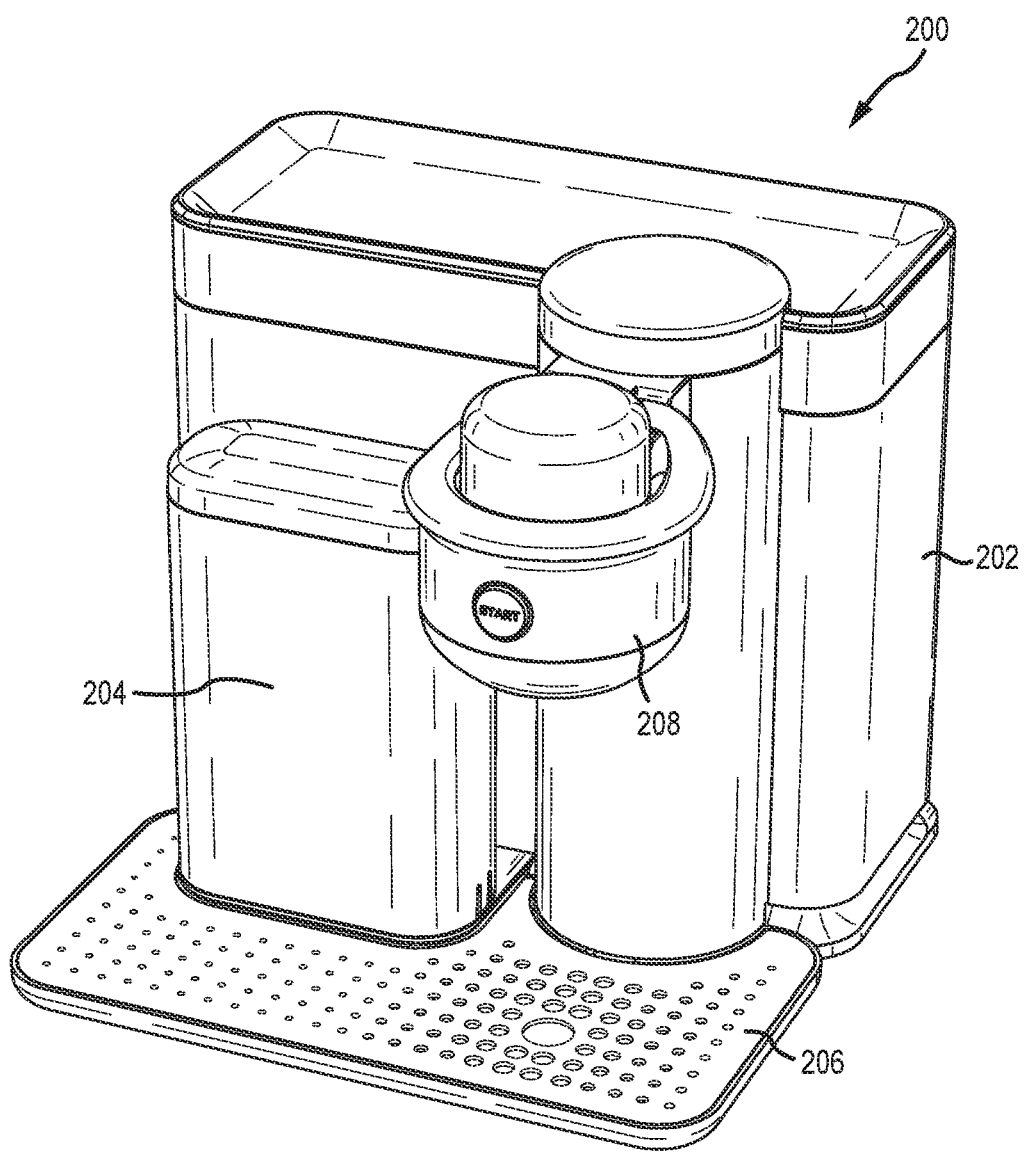
FIG. 2 depicts a sample beverage appliance.

With reference to FIG. 2, a sample beverage appliance 200 is shown. The beverage appliance can be substantially analogous to the beverage appliances described herein, such as the beverage appliance 104 described above with respect to FIGS. 1A-1C. In this manner, the beverage appliance 104 can include a variety of components that cooperate to produce multiple different beverage types, such as beverages having different carbonation levels. In this regard, the beverage appliance 200 can include components to implement the functionality of one or more of the container holder 108, the precursor supply 112, the pressurized gas supply 116, the internal chilling 120, the beverage mixing 124, the beverage dispensing 128, and/or the other subassemblies 132, described above with respect to FIGS. 1A-1C.

In the example of FIG. 2, the beverage machine 200 can include a housing 202 that shields various components of the machine, a reservoir 204 that holds a liquid (e.g., water) used to form a beverage, and a drip tray 206 that supports a user's cup or other container for receiving a dispensed beverage. The reservoir 204 can be removable from the housing 202, such that a user can fill the reservoir 204 with a beverage precursor liquid, such as water, that is used to form a beverage dispensed at a dispensing station 208 into a user's container. The reservoir 204 can include a movable lid to facilitate a user in filling the reservoir 204 with the precursor liquid. In various examples, the reservoir 204 can be replaced by a plumbed connection to a direct or main water source. The beverage precursor liquid can be any suitable liquid, including water or any other suitable liquid, used to form a beverage. The reservoir 204 or main water source can form part of a beverage precursor supply which provides the beverage precursor liquid for conditioning of some kind (e.g., filtering, chilling, carbonating, mixing with a beverage medium, and subsequent dispensing as a beverage).

Various components of the beverage machine 200 can be located within the housing 202. For example, a pump can be located within the housing 202 and can move precursor liquid from the reservoir 204 to a carbonation system, where the precursor liquid can be carbonated, via a gas. Depending on the particular application, the gas can be supplied by a pressurized canister or bottle, such as a carbon dioxide canister or bottle, located within the housing 202. In some examples, the precursor liquid can be chilled by a cooling system, either before, during, or after carbonation. Cooling the precursor liquid during carbonation can help the carbonation process. For instance, a cooler liquid tends to dissolve carbon dioxide or other gas more rapidly and/or is capable of dissolving a larger amount of gas. In some examples, the precursor liquid is cooled to about four degrees Celsius or lower to facilitate carbonation of the precursor liquid. The carbonated liquid can be moved to the dispensing station 208 and dispensed into the container 206. To generate a desired beverage, the carbonated liquid can be mixed with a beverage material (e.g., a flavoring agent or other associated substance) contained in a beverage container (e.g., such as the various beverage containers described herein). The beverage material can be emptied from the beverage container in a variety of ways. For instance, the beverage material can drain from the beverage container by gravity flow. Additionally or alternatively, as described in greater detail below, the beverage material can be moved out of the beverage container by introducing gas or fluid into the beverage container under pressure.

Control of the beverage machine 200 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage machine 200.

The beverage appliance 200 can be used with any of the beverage containers, capsules, pods, and the like described herein. FIGS. 3-6 depict a sample embodiment of a beverage container 304. The beverage container 304 can be used with the beverage appliance 200 and can be substantially analogous to the beverage containers described herein, such as the beverage container 150 described above with respect to FIGS. 1A-1C. In this manner, the beverage container 150 can include a variety of components that cooperate to enclose multiple different beverage material types for use with a beverage appliance in producing different beverages. In this regard, the beverage container 304 can include components to implement the functionality of one or more of the beverage material 154, the oxygen seal 158, the light shield 162, the beverage material access 166, and/or the other subassemblies 170 described above with respect to FIGS. 1A-1C.

Figure 3:
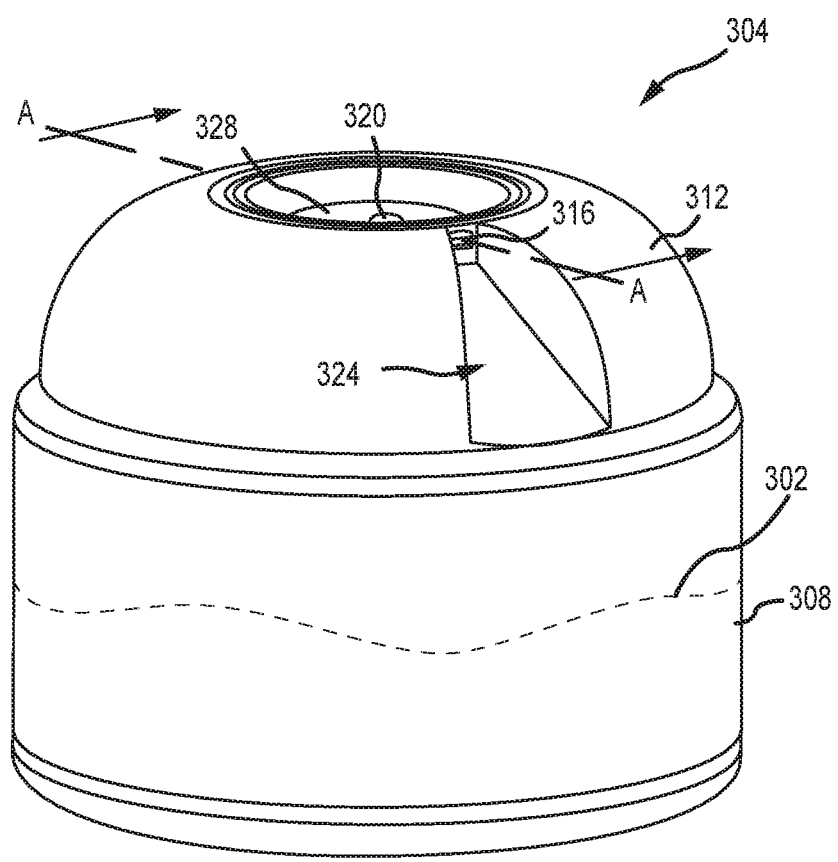
FIG. 3 depicts a sample beverage container.

In the example of FIG. 3, an isometric view of an exterior of the beverage container 304 is shown. The beverage container 304 can be configured to hold a target volume of a beverage material 302. The beverage container 304 can further be configured for engagement for an associated beverage machine or appliance (e.g., beverage appliance 104 of FIG. 1A, beverage appliance 200 of FIG. 2). The beverage container 304 is shown in FIG. 3 to have a body 308 defining a substantially cylindrical shape and holding a volume of the beverage material 302. The cylindrical shape can be tailored to hold the target volume of the beverage material 302. The cylindrical shape can be also define one or more dimensions that facilitate receipt of the beverage container 304 within a given beverage appliance.

In the example of FIG. 3, the beverage container 304 can be configured for fluidic engagement with an associated beverage appliance via the enclosure 312. For example, the enclosure 312 can define one or more openings, ports, conduits, and so on, that are configured to be coupled with the beverage appliance. The beverage appliance can, in turn, introduce fluid to the beverage container 304 (e.g., such as introducing pressurized gas) and/or receive material from the beverage container 304 (e.g., such as the beverage material 302) using through portions defined by the enclosure 312.

FIG. 3 shows the enclosure 312, including an inlet 316 and an outlet 320. The inlet 316 can be a through portion of the enclosure 312 that is configured to receive a supply of pressurized gas from the beverage appliance. As shown in greater detail with respect to FIGS. 4 and 8, the inlet 316 can be fluidically connected to one or more internal structures of the enclosure 312 that route the pressurized gas to the body 308 (e.g., for pressurizing the beverage material 302, which can facilitate exit from the beverage container 304). The outlet 320 can be another through portion of the enclosure that is configured for exit of the beverage material 302 (or other fluids of, or within, the beverage container 304). As shown in greater detail with respect to FIGS. 4 and 8, the outlet 320 can be fluidically connected to one or more internal structures of the enclosure 312 that routes the beverage material 302 from an internal space of the beverage container 304 to, for example, an intake of the beverage appliance.

The enclosure 312 can also include various other features that facilitate engagement of the beverage container 304 with a beverage appliance. For example, the beverage container 304 of FIG. 3 includes an alignment feature 324. The alignment feature 324 can include a notched or grooved portion along the exterior of the enclosure 312. Positioned within the notched or grooved portion can be the inlet 316; however, this is not required. Broadly, the alignment feature 324 can help guide the beverage container 304 into an appropriate position within a beverage appliance. This can help ensure proper connection between various fluidic coupling of the beverage appliance and the beverage container 304. For example, the alignment feature 324 can be configured to receive a corresponding alignment feature of the beverage appliance. In turn, the mating of each of the alignment features can correspond to an aligned or fluidically coupled position between, for example, a gas supply of the beverage appliance and the inlet 316 and/or an intake of the beverage appliance and the outlet 320.

As described herein, the beverage container 304 includes a moveable portion or element that can be advanced toward a sealed region for release of a beverage material, such as the beverage material 302 of FIG. 3. In the example of FIG. 3, a moveable portion 328 is shown. The moveable portion 328 can, in certain examples, define an exterior surface of the enclosure 312. For example, the moveable portion 328 can define an exterior surface of the enclosure 312 that is configured for engagement by a beverage appliance. For example, the moveable portion 328 can be contacted by an anvil or other corresponding moveable element of the beverage appliance, which can cause the moveable portion 328 to move inwards, toward the beverage material 302, subsequently causing its release. In this regard, the moveable portion 328 can define a substantially planar region or strike surface for contact with the anvil or other moveable structure of the beverage appliance. In other examples, other configurations are possible, including configurations in which the moveable portion 328 defines an irregular or contoured surface that matches a correspondingly irregular or contoured surface of the anvil or moveable portion of the beverage appliance, for example, which can help associate the beverage container 304 with a particular beverage appliance of the like.

The outlet 320 is shown in FIG. 3 as being positioned within and through a section of the moveable portion 328. This section can correspond to a piercing feature or the like within the enclosure 312. In other cases, the outlet 320 can be positioned off-set from a center of the moveable portion 328 and/or away from or off-set from the moveable portion 328, as can be appropriate for a given configuration.

Figure 4:
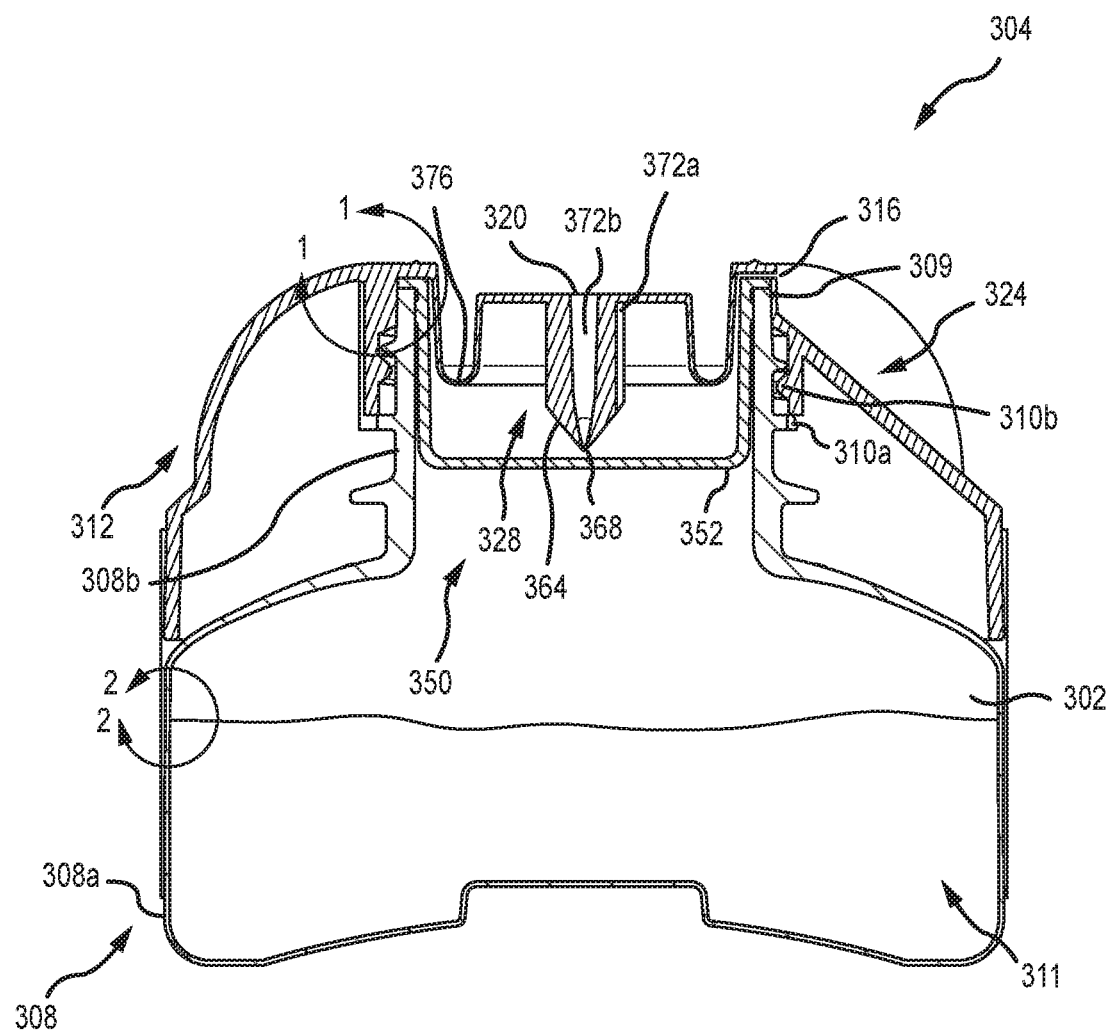
FIG. 4 depicts a cross-sectional view of the beverage container of FIG. 3, taken along line A-A of FIG. 3.

With reference to FIGS. 3 and 4, the body 308 of the beverage container 304 is shown holding the beverage material 302. FIG. 4 depicts a cross-sectional view of the beverage container of FIG. 3, taken along line A-A of FIG. 3. While the body 308 can take many forms to facilitate the functionality described herein, the body 308 can include a main portion 308a and a neck portion 308b. The main portion 308a can be configured to hold a target volume of the beverage material 302. The neck portion 308b can also hold some of the beverage material 302 and is configured to define an engagement structure that facilities connection of the enclosure 312.

The neck portion 308b can also define an opening or entrance into the internal space that holds the beverage material 302. For example, the neck portion 308b can include a rim 309 at a top portion that defines an opening leading into an internal space 311 holding the beverage material 302. During manufacture or assembly, the beverage material 302 can be introduced into the body 308 via the opening (e.g., within the rim 309). In turn, the opening can be sealed in order to enclose and store the beverage material 302 within the body 308. For example, as shown in FIG. 4, a membrane 352 or other pierceable sheet can extend over the opening and thus define a sealed region 350 over the area defined by the rim 309. The membrane 352, and sealed region 350 more generally, can shield or protect the beverage material 302 from an external environment, for example, until subsequent use by a beverage machine or appliance in producing a beverage.

The enclosure 312, shown in FIG. 4, can extend over the membrane 352 and form a seal with the body 308 about a perimeter of the opening (e.g., about the rim 309). To facilitate the foregoing, the neck portion 308b includes an engagement feature 310a. The engagement feature 310a can be threads that are configured for coupling with a corresponding engagement feature of the enclosure 312. Once coupled with the body 308 and positioned over the membrane 352, the enclosure 312 can operate to pierce the membrane 352 and release the beverage material 302, for example, in response to manipulation by a beverage machine or appliance.

For example and with reference to FIG. 4, the enclosure 312 is shown coupled with the body 308. While the enclosure 312 can take many forms to facilitate the functionality described herein, the enclosure 312 includes an attachment portion 380 and the moveable portion 328, described above. Generally, the attachment portion 380 can be configured for engagement with the body 308. The attachment portion 380 can be fixed relative to the body 308 despite the operations of an associated beverage machine or appliance, whereas the moveable portion 328 can move relative to the attachment portion 380 and the body 308 in response to one or more operations of the beverage machine.

To facilitate the foregoing, the attachment portion 380 can include a variety of features that allow for connection of the enclosure 312 to the body 308. In the example of FIG. 4, the enclosure 312 includes engagement features 310b. The engagement features 310b can be corresponding threads or other like features for mating with the engagement feature 310a of the body 308. The attachment portion 380 can define a substantially dome-shaped structure that fits over the membrane 352 and sealed region 350 more generally; however, other geometries are possible. In this regard, a section of the attachment portion 380 can define the alignment feature 324, the inlet 316, and/or any other feature of the enclosure that is positioned about the rim 309 when the enclosure 312 is engaged with the body 308. The attachment portion 380 can generally be a hollow structure or cover. In this regard, to enhance structural stability, the attachment portion includes structural ribs; however, this is not required. In other cases, the attachment portion 380 can include other members that enhance structural stability, including examples where some or all of the attachment portion is constructed from a substantially solid form.

As described above with respect to FIG. 3, the beverage container 304 includes a moveable portion 328. The moveable portion 328 is moveable relative to the attachment portion 380 and the body 308 in response to one or more operations of an associated beverage appliance. In order to facilitate movement of the moveable portion 328 relative to attachment portion 380, the enclosure 312 can include a flexible diaphragm 376. In this regard, the flexible diaphragm 376 can be a compliant member that deforms in response to a force. The compliant member is connected to each of the attachment portion 380 and the moveable portion 328. As such, the moveable portion 328 can receive a force (e.g., such as that from an anvil or other structure of a beverage appliance) that causes the moveable portion 328 to advance toward the body 308. As the moveable portion 328 moves, the connected flexible diaphragm can stretch or elongate while remaining connected to the attachment portion 380 (which is fixed to the body 308). As such, an interior of the enclosure 312 around the flexible diaphragm 376 can remain shielded from an external environment despite the movement of the moveable portion 328. This can be facilitated where the flexible diaphragm 376 forms a ring around the moveable portion 328, thereby promoting more uniform movement in response to operation of the beverage appliance.

The moveable portion 328 can include a variety of components and structures that facilitate accessing beverage material held within the body 308 of the beverage container 304. In the example of FIG. 4, a piercing feature 364 is shown. The piercing feature 364 can have an elongated body or otherwise be defined by an elongated protrusion having a sharp end portion 368. The sharp end portion 368 is configured for advancement through the membrane 352 or other structure that forms a seal over the sealed region 350 of the body 308.

The piercing feature 364 also includes the first passage 372a and the second passage 372b. The first passage 372a and the second passage 372b allow the piercing feature 364 to define discrete inlet and outlet paths through the membrane 352 for the internal space of the body 308. For example, the first passage 372a can be a blind recess defined along an exterior of the body of the piercing feature 364. The second passage 372b can be an elongated lumen extending through the piercing feature 364.

The enclosure 312 can be connected to the body 308 and define a covered region over the sealed region 350 of the body 308. For example and with reference to FIG. 4, the engagement features 310a and 310b can be coupled to one another for attachment of the enclosure 312 and the body 308. As such, the region encompassed by (e.g., surrounded by) the engagement features 310b (e.g., threads) shown in FIG. 4 can define a boundary of the covered region. This covered region can help define a flow path into the internal space defined by the body 308, for example, as described in greater detail below with respect to FIG. 8.

In one example, the inlet 316 can receive a supply of gas from an associated beverage appliance. The inlet 316 can be fluidically connected (e.g., via the covered region) with the first passage 372a. As such, the piercing features can be moved at least partially through the membrane 352 and define an inlet path to the internal space via the first passage 372a. The supply of gas can be directed into the internal space via the first passage 372, for example, for pressurization of the beverage material held therein. The beverage material (including pressurized beverage material) can in turn exit the beverage container 304 via the second passage 372b. The second passage 372b can be fluidically connected with the outlet 320 (shown in FIG. 3), which can be engaged with a beverage material intake of the beverage machine.

By substantially sealing the enclosure 312 to the body 308, the enclosure 312 can define one or more flow paths toward (or away from) the membrane 352 and beverage material held thereby. For example, as shown in FIG. 4, the inlet 316 is shown fluidically connected to an interior space between the moveable portion 328 and the membrane 352. As described above, the moveable portion 328 includes a piercing feature 364 having a first passage 372a defining an elongated blind recess. Accordingly, upon movement of the piercing feature 364 at least partially through the membrane 352, the fluidic connection of the inlet 316 and the interior space extends to the first passage 372a and through the membrane 352 and into an internal space 311 of the beverage container 304.

Also shown in FIG. 4, is the second passage 372b defined through a body of the piercing feature 364. It will be appreciated that upon movement of the piercing feature 364 at least partially through the membrane 352, the second passage 372b defines an outlet path extending from the internal space 311 through the membrane 352 and to an exit of the beverage container 304, such as the outlet 320. The outlet 320 can have a shape, contour, or other property that allows for a substantially sealed connection between the beverage cartridge and an intake or other feature of an associated beverage machine. Accordingly, the beverage material 302 (including pressurized beverage material) can flow through the second passage 372b and to the beverage machine for subsequent processing for beverage production, such as the various single-serve beverages described herein.

The beverage container 304 defines a sealed region that encompasses the beverage material 302. In this regard, when in the beverage container 304, the beverage material 302 can be substantially shielded from oxygen and light ingress. The seal formed between the membrane 352 and the body 308 can facilitate retaining the beverage material 302 in a sealed space. The seal between the membrane 352 and the body 308 can also help maintain the internal space 311 at a pressure above an atmospheric pressure, for example, when the beverage material 302 includes a carbonated material.

Figure 5:
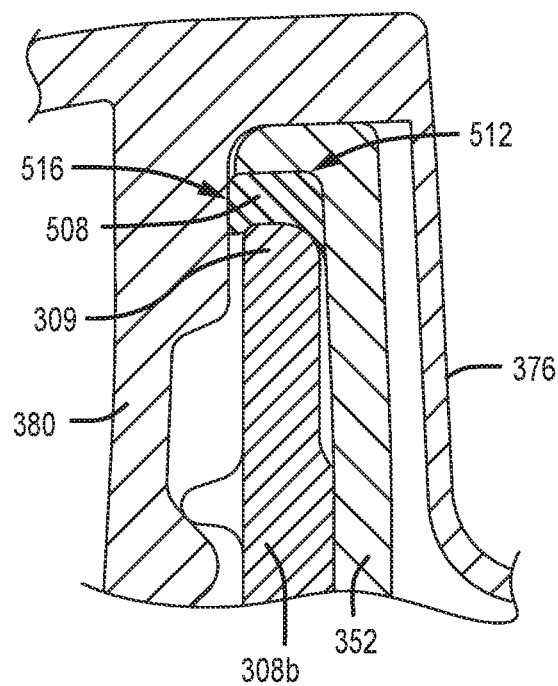
FIG. 5 depicts a detailed view of an embodiment of a beverage container sealed region.

FIG. 5 presents detail 1-1 of FIG. 4, which illustrates further features for maintaining the beverage material 302 within a sealed space. In particular, FIG. 5 is an enlarged schematic view of a connection between the various elements of the beverage container 304 once the body 308, the enclosure 312, and other components of the beverage container 304 are engaged in order to enclose the beverage material 302 therein.

As shown in FIG. 5, the beverage container 304 can include a gasket 508. The gasket 508 can engage the neck portion 308b, the membrane 352, and the attachment portion 380 to seal the beverage container 304. In this regard, the gasket 508, the neck portion 308b, the membrane 352, and/or the attachment portion 380 can cooperate to define an oxygen seal for the beverage container 304 (e.g., such as the oxygen seal 158 described in relation to FIG. 1B). In this regard and with reference to FIG. 1B, the beverage container 304, with operation of the gasket 508, can be adapted to maintain the beverage material contained therein sealed from an external environment for a period of at least 6 months, of at least 1 year, of at least 2 years, or of at least 5 years. During the period, the gasket 508, the neck portion 308b, the membrane 352, and/or the attachment portion 380 can facilitate the maintenance of this seal with the internal volume of the beverage container 304 and an external environment having a pressure differential of up to 40 psi. During the period, the gasket 508, the neck portion 308b, the membrane 352, and/or the attachment portion 380 can also help limit oxygen ingress into the internal volume to as low as 1 ppb or 2 ppb of oxygen per day. As such, during the period, the cumulative oxygen in the internal volume cane be maintained below 180 ppb, such as being below 150 ppb, below 100 ppb, below 50 ppb, below 10 ppb, or at or substantially around 0 ppb of cumulative oxygen due to ingress.

To facilitate the foregoing, the gasket 508 can create a plurality of seals within the beverage container 304. For instance, the beverage container 304 can create a first seal 512 between the membrane 352 and the neck portion 308b to limit leakage between the neck portion 308b and the membrane 352. The beverage container 304 can also create a second seal 516 between the neck portion 308b and the attachment portion 380 to limit leakage between the neck portion 308b and the membrane 352. In this manner, the gasket 508 can limit leakage of the beverage material 302 as well as allow the beverage container 304 to define an internal pressurized space.

The gasket 508 can be positioned at least partially between the neck portion 308b and the membrane 352. In such examples, the gasket 508 can engage a surface of the rim 309. When the attachment portion 380 is coupled to the neck portion 308b, the coupling of the attachment portion 380 to the neck portion 308b can cause the gasket 508 to deform laterally to the extent that it also engages the attachment portion 380. For instance, the coupling of the attachment portion 380 to the neck portion 308*b* can compress the gasket 508 between the membrane 352 and the neck portion 308*b*.

As shown in FIG. 5, compression of the gasket 508 can cause the gasket 508 to expand radially outward to engage the attachment portion 380. In this configuration, the gasket 508 limits leakage of the beverage medium 302 from the beverage container 304 by sealing the interface between the neck portion 308*b* and the membrane 352. This configuration also limits leakage of fluid between the attachment portion 380 and neck portion 308*b* to allow sufficient pressurization of the beverage container 304. Without the gasket 508 contacting the attachment portion 380, pressurized gas can leak. Though a single gasket 508 is sufficient to substantially seal the beverage container 304, in some examples, the beverage container 304 can include additional seals, such as a seal positioned between the attachment portion 380 and the membrane 352.

As described herein, the beverage container 304 is also configured to mitigate light ingress into the internal volume 311. Light, such as direct sunlight, can degrade the beverage material 302. For example, light can alter a composition of the beverage material 302 (e.g., due to heating) and/or otherwise change a taste of the beverage material 302. Shielding the beverage material 302 from light helps avoid such spoilage, and prolongs shelf life.

Figure 6:
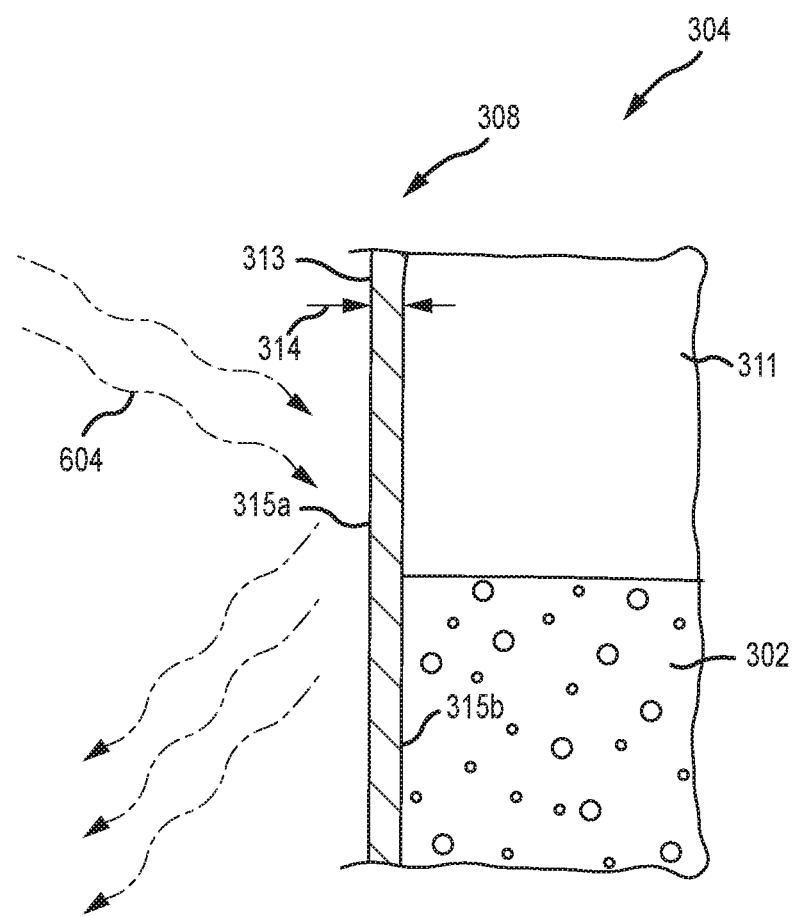
FIG. 6 depicts a detailed view of an embodiment of a beverage container wall.

With respect to FIG. 6, detail 2-2 of FIG. 4 of the beverage container 304 is shown. FIG. 6 shows the beverage material 302 enclosed within the internal volume 311, which can be pressurized. The beverage container 304 can be constructed from various materials that prevent light from reaching the beverage material 302. In the example of FIG. 6, the body 308 is shown being formed at least partially from an opaque barrier material 313. The opaque barrier material 313 can form walls of the body 308. The opaque barrier material 313 can be a uniform structure, such as that shown in FIG. 6. In other cases, the opaque barrier material 313 can be a composite structure having multiple layers, each of which can cooperate to limit light ingress into the internal volume 311.

The opaque barrier material 313 is shown in FIG. 6 as having a thickness 314. The thickness 314 of the opaque barrier material 313 can be calibrated to maintain the internal volume 311 at a specified pressure. For example, the beverage container 304 can generally have a burst resistance of up to 40 psi. In this manner, the thickness 314 of the opaque barrier material 313 can be calibrated to maintain a pressure differential of up to 40 psi between the internal volume 311 and an external environment.

The opaque barrier material 313 can define at least an external surface 315*a* and an internal surface 315*b*. Notwithstanding the opaque barrier material 313 optionally being a one-piece structure, the external surface 315*a* and the internal surface 315*b* can exhibit distinct material properties and/or perform distinct functions. For example, the external surface 315*a* can generally define a contaminant barrier and can have light-reflective properties. For example, FIG. 6 shows light 604 (such as direct sunlight) propagating toward the external surface 315*a*. The light 604 can impact the external surface 315*a*, and at least some of the light 604 can be reflected away from the beverage container 304. For example, the external surface 315*a* or other portion of the beverage container 304 can be formed from a material (e.g., opaque barrier material 313) that is adapted to block light that is substantially within the range of 300 nm to 500 nm. The internal surface 315*b* can generally define a food-grade surfaces that facilitate storing and holding the beverage material 302 within the internal volume 311. The internal surface 315*b* can exhibit crack-resistive properties, and thus help limit propagation of the beverage material 302 through the opaque barrier material 313, even when the beverage container 302 is dropped or otherwise subjected to excess forces.

Figure 7:
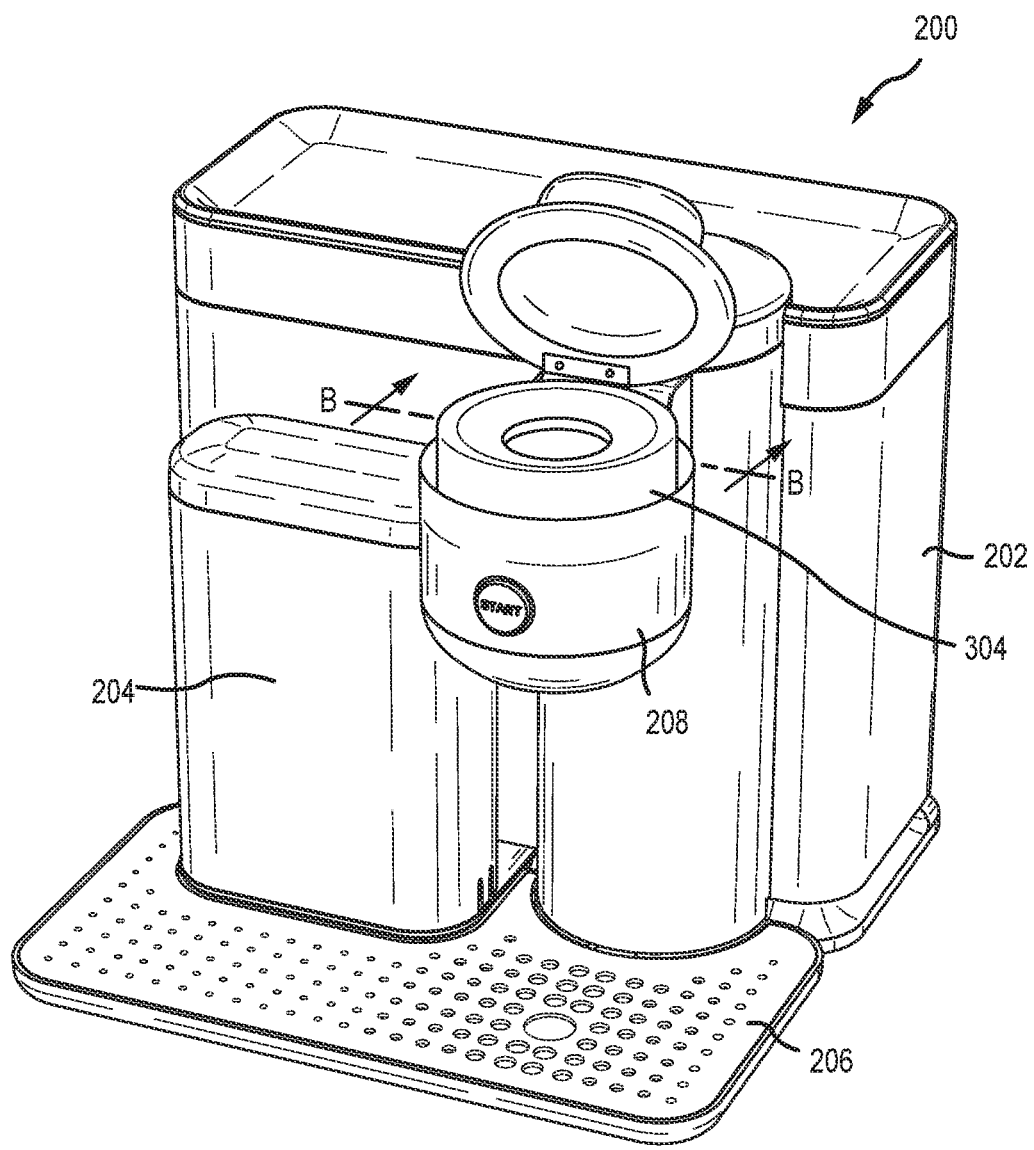
FIG. 7 depicts the beverage container of FIG. 3 received by the beverage appliance of FIG. 2.

In operation, any of the beverage containers described herein can be associated with a beverage appliance. The beverage appliance is in turn used to produce one of a variety of different beverages, based in part on the beverage material sealed within a respective beverage container. To illustrate the foregoing, FIG. 7 shows the beverage container 304 associated with the beverage appliance 200. The beverage appliance 200 generally includes a compartment, such as that described with respect to the container holder 108 of FIG. 1C, that receives the beverage container 304. While a variety of configurations are possible, as shown in FIG. 7, the beverage container 304 is generally reoriented from an upright position shown in FIGS. 3 and 4 into a downward position.

In the downward position of the beverage container 304 shown with respect to FIG. 7, the moveable portion 328 is positioned substantially within the beverage appliance 200. The beverage appliance 200 can generally include an anvil or other structure that engages the moveable portion 328. Once engaged, the moveable portion 328 can be advanced upward, toward a sealed region of the beverage container 304, and cause beverage material therein to be released.

Figure 8:
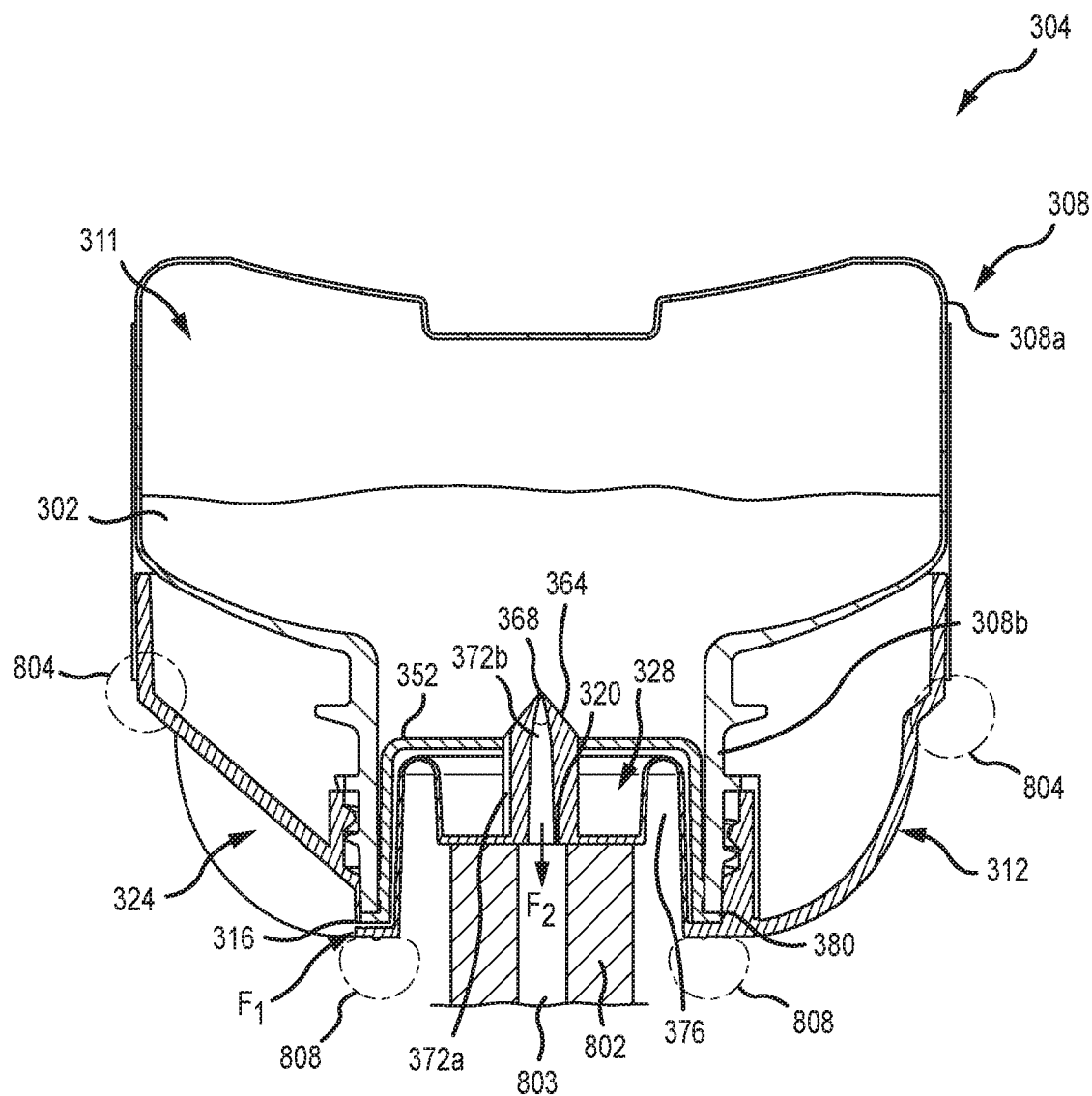
FIG. 8 depicts a cross-sectional view of the beverage container of FIG. 3 in a received configuration within the beverage appliance of FIG. 2, taken along line B-B of FIG. 7.

To illustrate the foregoing operation, FIG. 8 depicts a cross-sectional view of the beverage container 304 in a received configuration with the beverage appliance 200, generally taken along line B-B of FIG. 7. When the beverage container 304 is received by the beverage appliance 200, the beverage appliance 200 can operate to move the moveable portion 328. As describe herein, movement of the moveable portion 328 can cause the piercing feature 364 to advance at least partially through the membrane 352 and release the beverage material 302.

To facilitate the foregoing and as shown in FIG. 8, the beverage appliance 200 includes an anvil 802. The anvil 802 is an internal structure within the beverage appliance 304 that is configured to engage the moveable portion 328 of the beverage container 304. The anvil 802 is moveable within the beverage appliance 200, for example, by an internal motor, from an initial position to an advanced position in which the anvil is advanced toward the beverage material 302, shown in FIG. 8.

In the advanced position shown in FIG. 8, the beverage appliance 200 can initiate one or more flows with and from the beverage container 304. For example, FIG. 8 shows a first flow $F_1$ that is directed toward the inlet 316. As described herein with respect to FIGS. 3 and 4, the inlet 316 is fluidically coupled with the first passage 372*a*. As the first passage 372*a* extends at least partially through the membrane 352, the flow $F_1$ can travel through the inlet 316 and into the internal space 311. The flow $F_1$ can be a pressurized gas, precursor liquid, or combination thereof. In this manner, the internal space 311 can be pressurized in order to facilitate release of the beverage material 302.

In the example of FIG. 8, the beverage material 302 can be released along the flow path $F_2$. For example and as described herein with respect to FIGS. 3 and 4, the second passage 372*b* can extend at least partially through the membrane 352. This can provide an exit path for the beverage material 302 substantially through the piercing feature 364. Upon exit from the beverage container 304, the beverage material 302 can flow into the beverage appliance 200. In some cases, the anvil 802 can have an intake 803 that guides the beverage material 302 to one or more internal processes of the beverage appliance 200. Once received within the beverage appliance, the beverage material 302 can be used to produce one or more target beverages, as described herein.

The beverage container 304 and the beverage appliance 200 can be temporarily sealed or sealed related to one another in order to facilitate the flow of fluids therebetween. In the example of FIG. 8, upper seal regions 804 and lower sealed regions 808 are defined between the beverage container 304 and the beverage appliance 200. The beverage container 304 and the beverage appliance 200 can be mated or contacting one another at each of the upper seal regions 804 and the lower seal region 808. This configuration can allow the flow $F_1$ and the flow $F_2$ to operate at a pressure above an ambient pressure and avoid fluid loss associated with leaks. For example, the flow $F_1$ proceeds substantially between the upper seal regions 804 and the lower seal regions 808, and as such can be directed into the inlet 316. The flow $F_2$ is also shown within a sealed environment, as the beverage material 302 exits the beverage container 304 and proceeds into the intake 803.

As described herein, the beverage appliance of the present disclosure can include a cooling system. The cooling system can generally be used to chill a precursor supply to a desired temperature. This can facilitate introduction of pressurized gas into the precursor supply, in order to carbonate the precursor supply. Chilling the precursor supply can also help the beverage appliance deliver a beverage product at a desired temperature. In some cases, different beverages can have different target serving temperatures. As such, the cooling system facilitates the use of the beverage appliances described herein, producing multiple different beverages, such as those having different characteristics, including different carbonation levels.

Figure 9:
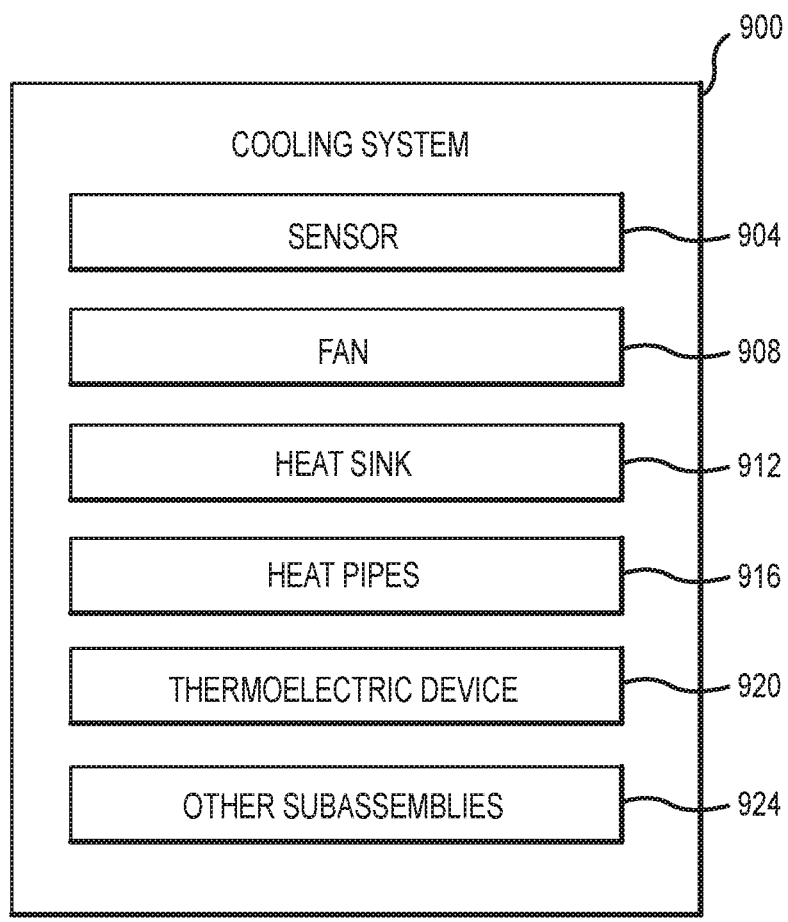
FIG. 9 depicts a functional block diagram of a cooling system of a beverage appliance.

In this manner, FIG. 9 depicts an example functional diagram of a cooling system 900. The cooling system 900 can be used with or integrated within any of the beverage appliances described herein, such as the beverage appliance 104 of FIGS. 1A-1C and the beverage appliance 200 of FIG. 2. In this manner, the cooling system 900 can include components and instruments used to facilitate one or more of the functions described with respect to the internal chilling 120 of FIG. 1C.

For example, FIG. 9 shows the cooling system having a sensor 904. The sensor 904 can be configured to detect a parameter of the precursor supply or other fluid of an associated beverage appliance. The sensor 904 can be a temperature sensor that is configured to determine a temperature of the precursor supply. Additionally or alternatively, the sensor 904 can include other sensor types, such as a flow sensor, ice sensor, and so on. The cooling system 900 is configured to remove heat from the precursor supply when the parameter detected by the sensor 904 satisfies a threshold value. As an illustration, the sensor 904 can detect a temperature of the precursor supply exceeding a target beverage delivery temperature. In turn, the cooling system 900 can remove heat from the precursor supply, thereby reducing its temperature. Conversely, the sensor 904 can detect the precursor supply within a threshold range of freezing, such as exhibiting a temperature of within 20% of a freezing temperature of the precursor supply. In response, the cooling system 900 can stop removing heat and allow the precursor supply to return to an elevated temperature. In some cases, the cooling system 900 can actively heat the precursor supply in order to avoid ice formation.

While it will be appreciated that the cooling system 900 can include various components, including refrigeration-type systems, to perform the functions described herein, FIG. 9 shows the cooling system 900 further including a fan 908, a heat sink 912, heat pipes 916, a thermoelectric device 920, and other subassemblies 924.

In one example, the cooling system 900 can include the heat sink 912 in an arrangement to heat a precursor supply held within a tank. For example, the cooling system 900 can include the thermoelectric device 920 thermally coupled to such tank to cool precursor liquid in the tank. The heat pipes 916 can be arranged within the cooling system 900 to have an evaporator section and a condenser section with the evaporator section thermally coupled to the thermoelectric device 920 to receive heat from the thermoelectric device 920. The heat sink 912 can be thermally coupled to the condenser section of the heat pipes 916 to receive heat from the heat pipe 916. A housing of the associated beverage appliance can at least partially surround the tank and include a duct with a flow channel extending from a duct inlet to a duct outlet. The heat sink 912 can be positioned in the flow channel for contact with air passing through the flow channel, e.g., to transfer heat to air in the duct, and the duct can be arranged such that any precursor liquid entering the duct outlet is directed to a bottom of the housing.

In operation, a cooling air flow can be moved through the ducts and across the heat sinks 912 by the fan 908, another air mover, and/or in other ways, such as by convection. The use of a thermoelectric device/heat pipe/heat sink arrangement is not required for all examples, however, and other examples can include a conventional refrigeration system or other cooling system (such as that found in refrigerators, air conditioning units, or other devices used to remove heat from a material) to cool the liquid in the tank or elsewhere in the system. In some arrangements, cooling the precursor liquid before entering or while in the tank can help the carbonation process, e.g., because cooler liquids tend to dissolve carbon dioxide or other gases more rapidly and/or they are capable of dissolving larger amounts of gas. However, the carbonated liquid could be chilled after flowing from the carbonation tank, e.g., using a flow-through device.

Figure 10:
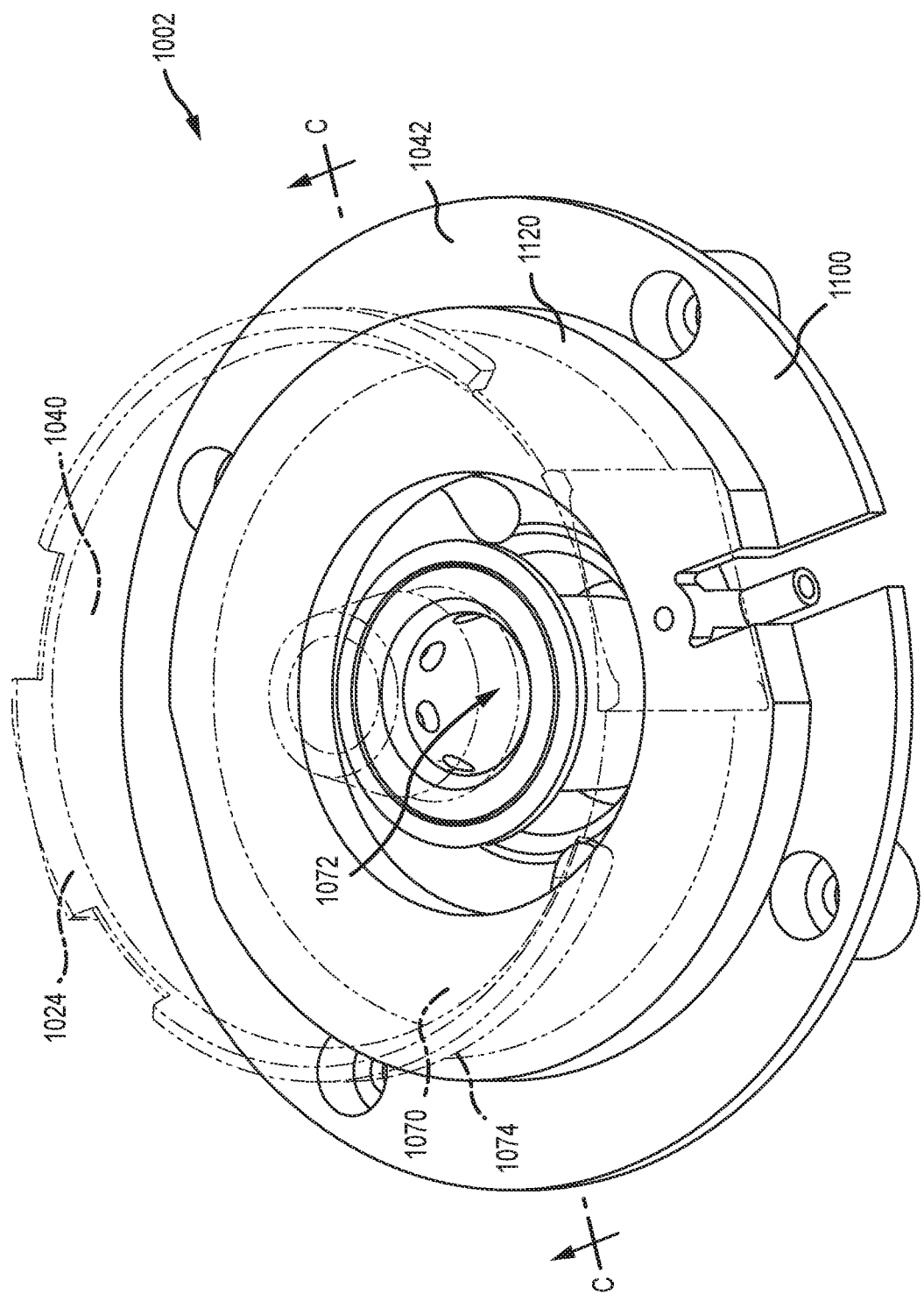
FIG. 10 depicts a sample dispensing assembly.
Figure 11:
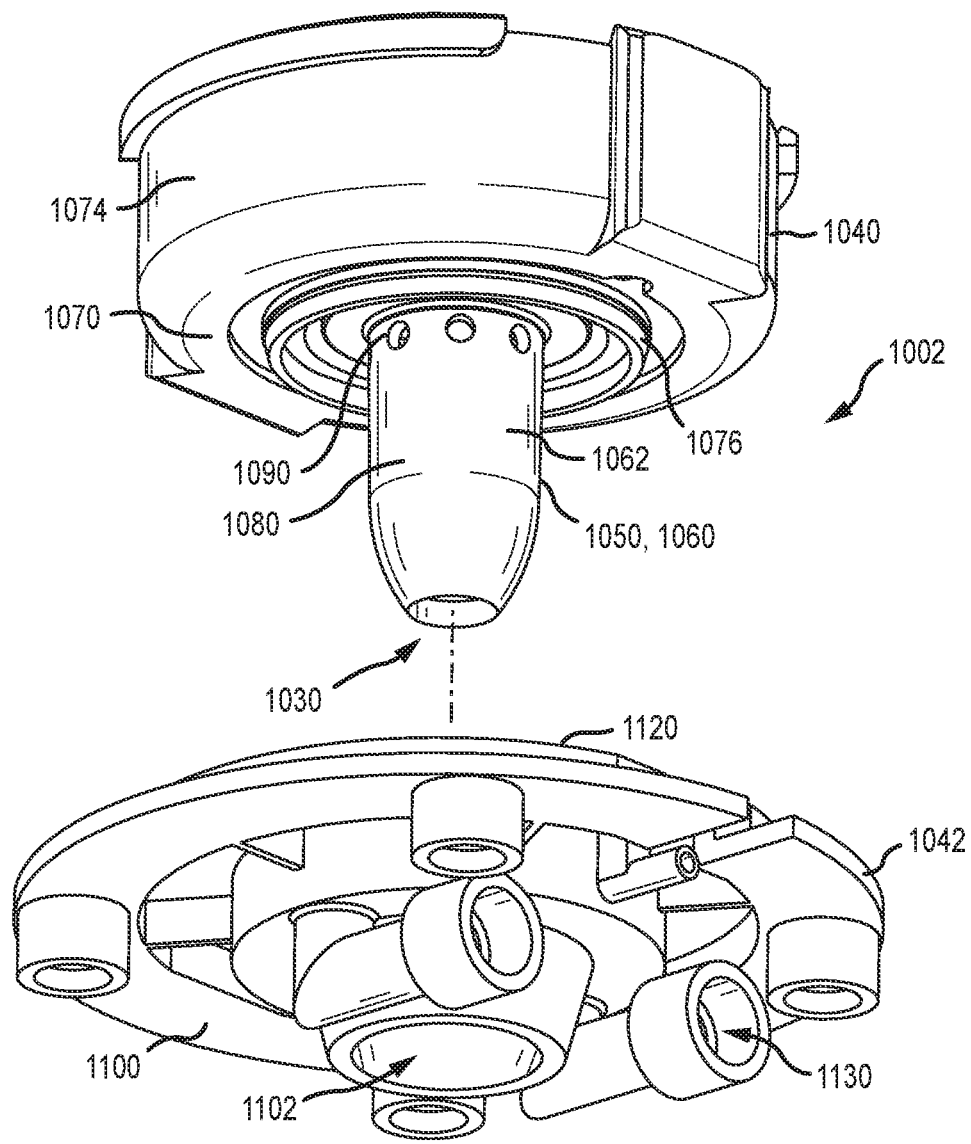
FIG. 11 depicts an exploded view of the dispending assembly of FIG. 10.
Figure 12:
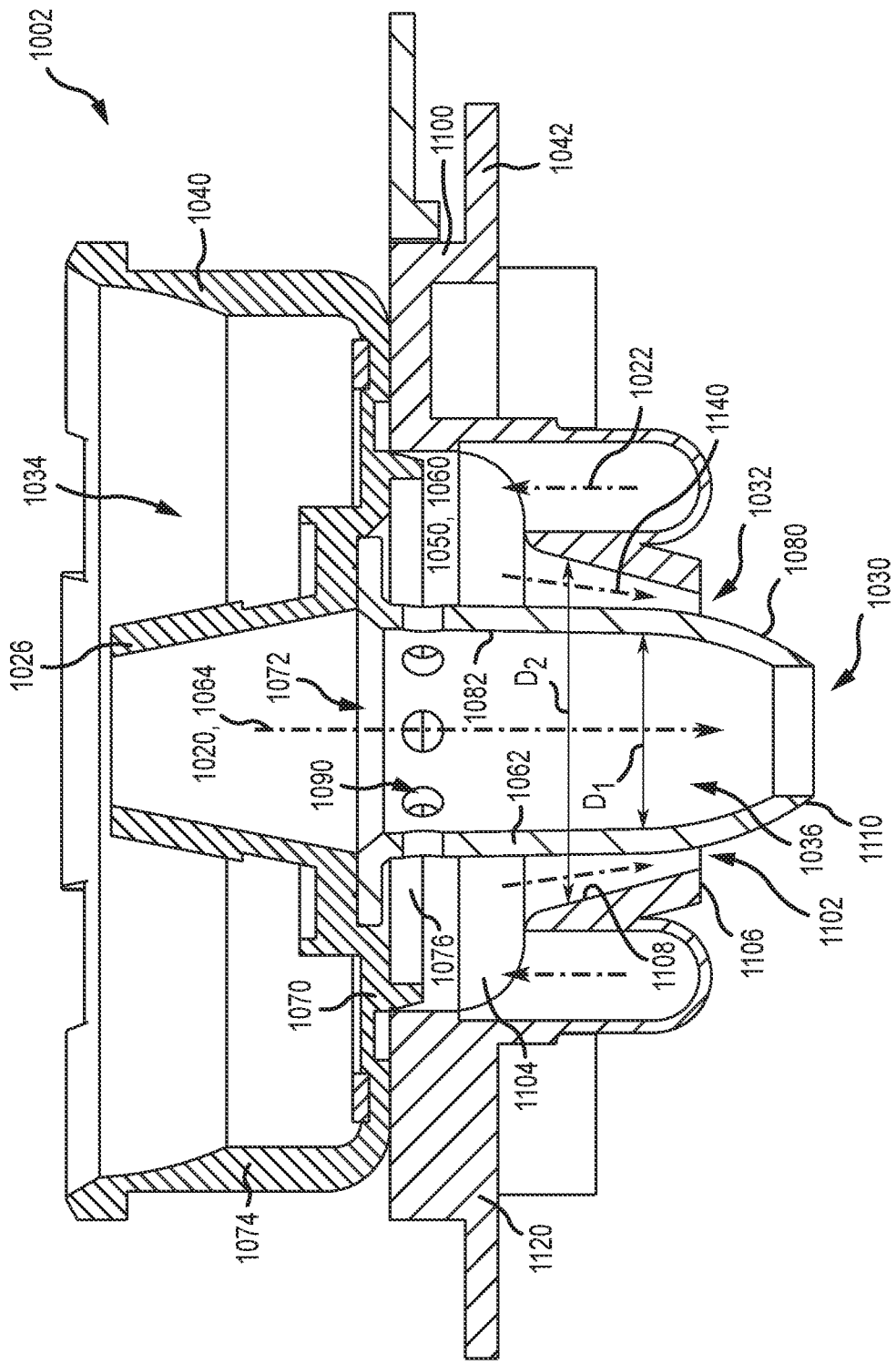
FIG. 12 is a cross-sectional view of the dispensing assembly of FIG. 11, taken along line C-C of FIG. 10.

FIGS. 10-12 depict a sample implementation of a dispensing assembly 1002. The dispensing assembly 1002 can be used to implement one or more of the functions of the beverage appliance 104 described with respect to FIGS. 1A-1C. In particular, the dispensing assembly 1002 can be configured to mix a precursor supply and a beverage material. The dispensing assembly 1002 can be further configured to dispense the mixture of the precursor supply and the beverage material into an end-use receptacle.

By way of particular example, FIG. 10 is an isometric view of the dispensing assembly 1002. FIG. 11 is an exploded view of the dispensing assembly 1002. FIG. 12 is a cross-sectional view of the dispensing assembly 1002 taken along line C-C of FIG. 10. Referring to FIGS. 10-12, the dispensing assembly 1002, which can be referred to as a dispensing apparatus, can be arranged to dispense first and second liquids 1020, 1022 simultaneously or near simultaneously. As shown in FIG. 12, the dispensing assembly 1002 can include a first outlet 1030 and a second outlet 1032. The first outlet 1030 can be in fluid communication with a first liquid chamber, such as a liquid pod or reservoir (not shown), seated in the first liquid chamber 1034. The first liquid 1020 can pass through the first liquid chamber, to be dispensed through the first outlet 1030. The second outlet 1032 can be in fluid communication with a second liquid source such as a carbonated water reservoir and tubing (not shown) that passes through the second liquid chamber 1036. The second liquid 1022 can pass through the liquid tubing into the second liquid chamber 1036, to be dispensed through the second outlet 1032.

The first and second liquid chambers or fluid sources, as well as the first and second outlets 1030, 1032, can be defined in many configurations. As one example, the dispensing assembly 1002 can include first and second elements 1040, 1042 connected together to define the first and second liquid chambers 1034, 1036 and/or the first and second outlets 1030, 1032. For example, as shown in FIG. 12, the first and second elements 1040, 1042 can be connected together to define an internal wall 1050 at least partially separating the first and second liquid chambers 1034, 1036 within the dispensing assembly 1002. Additionally or alternatively, the internal wall 1050 can at least partially define the first and second outlets 1030, 1032, as described in detail below. While the current disclosure specifies a physical wall 1050 between the first and second liquids, a number of alternative configurations can be used to accomplish the desired dispensing behavior. According to one example, the second liquid can be passed through several liquid ports formed circumferentially around the first outlet 1030 and aimed at a central location to form an annular ring. According to this example, the first stream would fall through the first outlet 1030 and intersect the second stream without a physical barrier separating the streams.

The first element 1040, which can be considered an inner or upper element, can define the first outlet 1030 through which the first liquid 1020 is dispensed. Referring to FIGS. 11 and 12, the first element 1040 can include a cylindrical wall 1060 defining a tube 1062 through which the first liquid 1020 passes to the first outlet 1030. In such examples, the first liquid 1020 can form a first liquid stream 1064 when dispensed through the first outlet 1030. The tube 1062 can at least partially define the first liquid chamber 1034. The cylindrical wall 1060 can extend from a top wall 1070 of the first element 1040. In such examples, an aperture 1072 can be defined through the top wall 1070, the aperture 1072 being in fluid communication with the first liquid chamber 1034. The cylindrical wall 1060 of the first element 1040 can at least partially define the internal wall 1050 separating the first and second liquid chambers 1034, 1036 and/or defining the first and second outlets 1030, 1032. As such, any description with reference to the cylindrical wall 1060 can apply to the internal wall 1050, or vice versa. An annular flange 1074 can extend from the top wall 1070. The annular flange 1074 and top wall 1070 can define the pod receiver 1024 arranged to hold a beverage pod. As shown, the annular flange 1074 can extend in a direction opposite the cylindrical wall 1060. The annular flange 1074 can be concentrically aligned with the cylindrical wall 1060, though other relationships are contemplated. In some examples, the first element 1040 can include a post 1026 arranged to pierce or puncture the pod such that the pod's contents are emptied into the pod receiver 1024 and/or the tube 1062 for subsequent dispensing through the first outlet 1030. As shown, the post 1026 can be in fluid communication with the tube 1062, such as positioned above and concentrically aligned with the tube 1062. In some examples, the first element 1040 can include a seal 1076 extending from or positioned adjacent to the top wall 1070. The seal 1076 can annularly surround at least a portion of the cylindrical wall 1060. The seal 1076 can be structurally defined as part of the first element 1040, or can be an O-ring or other sealing apparatus.

The cylindrical wall 1060 of the first element 1040 can include many configurations. As shown, the cylindrical wall 1060 can include a circular cross-section, though other shapes are contemplated, including polygonal or elliptical, among others. The cylindrical wall 1060 can include an exterior surface 1080 and an interior surface 1082. In such examples, the interior surface 1082 of the cylindrical wall 1060 can define a diameter $D_1$ of the first outlet 1030. Depending on the particular application, the diameter $D_1$ of the first outlet 1030 can be between 2 and 8 millimeters. The diameter $D_1$ of the first outlet 1030 can be sized to provide a consistent water cone formation. The diameter $D_1$ of the first outlet 1030 can also be sized to limit the potential of the first liquid 1020 fouling the exit surfaces of the first outlet 1030 before the first liquid 1020 exits the first outlet 1030 and mixes with the second liquid 1022. The cylindrical wall 1060 can include a uniform or substantially uniform thickness such that the exterior and interior surfaces 1080, 1082 extend generally parallel to each other. In alternative examples, the thickness of the cylindrical wall 1060 can vary, such as with distance away from the top wall 1070. In one example, the cylindrical wall 1060 can taper in diameter to the first outlet 1030. In such examples, the cylindrical wall 1060 can define a nozzle shaping the flow of the first liquid 1020 through the first outlet 1030.

In one example, one or more apertures 1090 can be defined through the cylindrical wall 1060. In such examples, the one or more apertures 1090 can connect the exterior surface 1080 of the cylindrical wall 1060 or tube 1062 with the interior surface 1082 of the cylindrical wall 1060 or tube 1062. The one or more apertures 1090 can be spaced at a distance away from the first outlet 1030. For example, the one or more apertures 1090 can be defined adjacent to the top wall 1070 of the first element 1040. In some examples, the one or more apertures 1090 can be defined above the second outlet 1032 of the dispensing assembly 1002. As explained more fully below, the one or more apertures 1090 can selectively connect the first and second liquid chambers 1034, 1036 to provide a desired functional characteristic. For example, at least a portion of the second liquid 1022 can selectively pass through the one or more apertures 1090 to be dispensed through the first outlet 1030 for the purposes explained below.

With continued reference to FIGS. 10-12, the second element 1042, which can be considered an outer or lower element, can define the second outlet 1032 through which the second liquid 1022 is dispensed. The second element 1042 can include an annular wall 1100 with an opening 1102 therethrough to define the second outlet 1032. The annular wall 1100 can include a top shelf 1104 and a bottom surface 1106. A sidewall 1108 can extend between the top shelf 1104 and the bottom surface 1106 to define the opening 1102. The sidewall 1108 can be sloped such that the opening 1102 tapers in diameter to the second outlet 1032. The sidewall 1108 can define a diameter $D_2$ of the second outlet 1032. The diameter $D_2$ of the second outlet 1032 can be greater than the diameter $D_1$ of the first outlet 1030. Depending on the particular application, the diameter $D_2$ of the second outlet 1032 can be between 7.0 and 10.5 millimeters, such as between 8.5 and 9.0 millimeters. As shown in FIG. 12, the cylindrical wall 1060 of the first element 1040 can extend beyond the bottom surface 1106 of the second element 1042. For example, a dispensing end 1110 of the cylindrical wall 1060 can protrude between 3.0 and 5.0 millimeters beyond or below the bottom surface 1106 of the second element 1042.

The second element 1042 can include a flange 1120 extending from the top shelf 1104 for connection with the first element 1040. For instance, the flange 1120 of the second element 1042 can abut the top wall 1070 of the first element 1040 when the first and second elements 1040, 1042 are connected together. Depending on the particular application, the first and second elements 1040, 1042 can be releasably or permanently secured together. For instance, in one example, the seal 1076 of the first element 1040 can sealingly engage the flange 1120 of the second element 1042. The engagement between the seal 1076 and the flange 1120 can seal the second liquid chamber 1036. The engagement between the seal 1076 and the flange 1120 can frictionally hold the first and second elements 1040, 1042 together such that the first element 1040 is removable from the second element 1042. In such examples, the first element 1040 can be removed for cleaning, replacement, etc. In other examples, the first and second elements 1040, 1042 can be secured together by adhesive, fasteners, heat or sonic welding, or the like to limit disassembly of the dispensing assembly 1002.

As shown in at least FIG. 11, the second element 1042 can include one or more ports 1130. In such examples, the second liquid 1022 can be pumped through the one or more ports 1130 for dispensing through the second outlet 1032. In one example, the second liquid 1022 can pass through the one or more ports 1130 and be discharged onto the top shelf 1104 of the second element 1042 (see FIG. 12). In such examples, the second liquid 1022 can flow inwardly from the top shelf 1104 and down the sidewall 1108 of the second element 1042 to form a second liquid stream 1140 out of the second outlet 1032. Depending on the particular application, the flow of the second liquid 1022 can be laminar along the top shelf 1104 and sidewall 1108. As described more fully below, the flow of the second liquid 1022 can be limited such that the second liquid stream 1140 forms an annular liquid column or ring when dispensed through the second outlet 1032. Additionally or alternatively, the second liquid 1022 can contact the exterior surface 1080 of the cylindrical wall 1060 of the first element 1040 to define the annular liquid column. For instance, the second liquid 1022 can contact the sidewall 1108 of the second element 1042 as well as the exterior surface 1080 of the cylindrical wall 1060 of the first element 1040 to define a ring shape of the second liquid stream 1140. In this manner, the cylindrical wall 1060 of the first element 1040 can be positioned at least partially within the second outlet 1032 of the second element 1042. In such examples, at least a portion of the exterior surface 1080 of the cylindrical wall 1060 or tube 1062 can be disposed within the second outlet 1032. As explained below, the second liquid stream 1140 can annularly surround the first liquid stream 1064 when the first and second liquids 1020, 1022 are first dispensed through the first and second outlets 1030, 1032.

As described herein, the various beverage systems, appliances, machines, devices, and so forth can operate to receive a beverage container and access sealed beverage material from the beverage container. The beverage systems can, in turn, process the beverage material and produce a single-serving or other beverage. To facilitate the foregoing, the beverage system can include any appropriate combination and collection of piping, instruments, controls, tanks, vessels, and so forth, including having a supply (or connection to) pressurized gas, precursor liquids, and so forth, that can be used in conjunction with the beverage material of the beverage container to produce a beverage.

Figure 13:
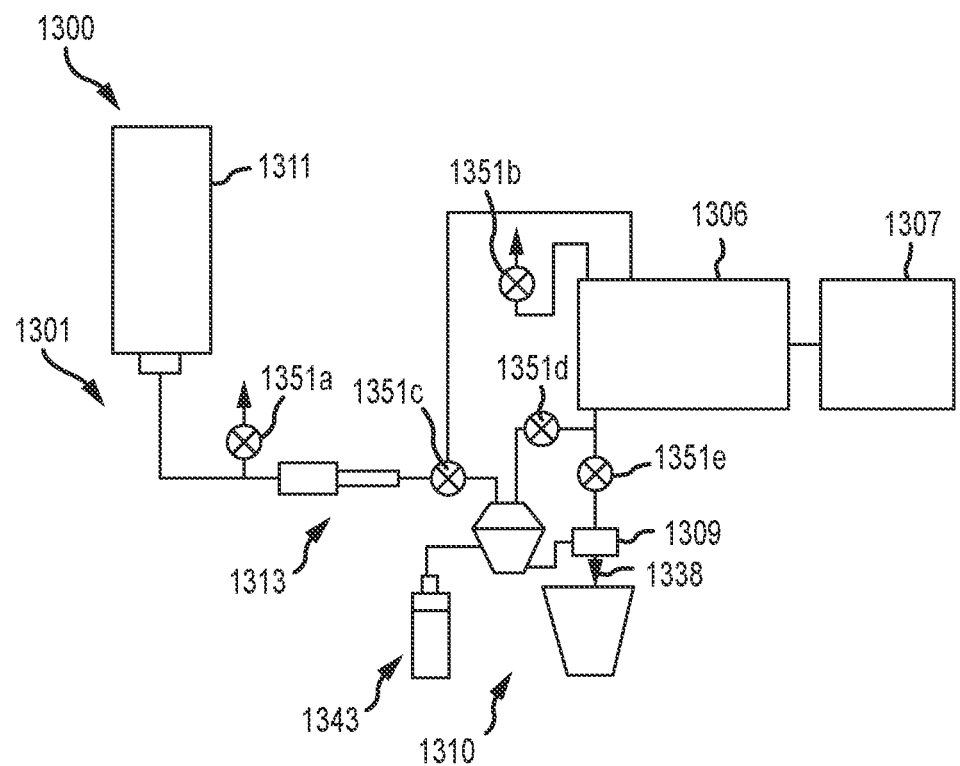
FIG. 13 depicts a schematic view of a beverage system.

As such, while many configurations are possible and within the scope of the present disclosure, FIG. 13 depicts an example diagram illustrating various components of the beverage system described herein. For example, FIG. 13 shows a beverage system 1300 that can be used with a container 1310 that incorporates exemplary features of the present systems and methods. In this illustrative example, precursor liquid, such as water, is provided by a precursor liquid supply 1301 that originates in the reservoir 1311, which can be removable from the system 1300, (e.g., to allow for easier filling), or can be fixed in place. Although in this example, a user initially provides the beverage precursor liquid in the reservoir 1311, the precursor liquid supply 1301 can include other components to provide liquid to the reservoir 1311, such as a plumbed water line, controllable valve, and liquid level sensor to automatically fill the reservoir 1311 to a desired level, a second water reservoir or other tank that is fluidly connected to the reservoir 1311, and other arrangements. Liquid is delivered by a pump 1313 to the carbonation tank 1306 via a three-way valve 1351c. In this instance, the pump 1313 is a solenoid pump, but other pump types are possible. The carbonation tank 1306 can be suitably filled with liquid using any suitable control method, such as by sensing a level in the carbonation tank 1306 using a conductive probe, pressure sensor, optical sensor or other sensor. A tank vent valve 1351b can be opened during filling to allow the pressure in the carbonation tank 1306 to vent, or can remain closed during filling, e.g., to allow a pressure build up in the carbonation tank 1306. Though not shown in FIG. 13, a control circuit can control operation of the valves 1351 (e.g., the valves 1351 can include electromechanical or other actuators), as well as include sensors to detect various characteristics, such as temperature in the carbonation tank 1306, pressure in the carbonation tank 1306, a flow rate of gas or liquid in any of the system flow lines, etc.

To form a beverage, a user can associate a container 1310 with the system 1300, e.g., by loading the container 1310 into a container receiver. In this example, however, the container 1310 can include each of a lower vessel and an upper vessel. The upper vessel can contain a gas source arranged to release carbon dioxide or other gas under pressure for dissolution in a liquid (e.g., for carbonating water). With the container 1310 associated with the system 1300, the control circuit can then activate the system 1300 to deliver liquid to the upper vessel (e.g., to cause carbon dioxide to be generated). (Though this example uses a container 1310 with a gas source activated by a fluid, other arrangements are possible, including the use of a pressurized gas cylinder as a gas source.) The control circuit can start operation of the system 1300 in an automated way (e.g., based on detecting the presence of a container 1310), detecting liquid in the carbonation tank 1306 and closure of the container receiver, and/or other characteristics of the system 1300. Alternately, the control circuit can start system operation in response to a user pressing a start button or otherwise providing input (e.g., by voice activation) to start beverage preparation.

To initiate carbonation, the vent valve 1351b can be closed and the three-way valve 1351c controlled to allow the pump 1313 to pump liquid into the upper vessel that contains a gas source. That is, the system 1300 can include a carbon dioxide-activating fluid supply that provides a fluid to an upper vessel so as to activate a carbon dioxide source in the upper vessel to release carbon dioxide gas. In this example, the carbon dioxide source includes a charged adsorbent or molecular sieve (e.g., a zeolite material that has adsorbed some amount of carbon dioxide gas that is released in the presence of water, whether in vapor or liquid form). Of course, other carbon dioxide source materials can be used, such as charcoal or other molecular sieve materials, carbon nanotubes, metal organic frameworks, covalent organic frameworks, porous polymers, or source materials that generate carbon dioxide by chemical means, such as sodium bicarbonate and citric acid (with the addition of water if the bicarbonate and acid are initially in dry form), compressed carbon dioxide bottle gas, or others. In addition, aspects of the exemplary system and method are not necessarily limited to use with carbon dioxide gas, but can be used with any suitable gas, such as nitrogen, which is dissolved in some beers or other beverages, oxygen, air, and others. Thus, reference to "carbonation," "carbon dioxide source," "carbon dioxide-activating fluid supply," etc., should not be interpreted as limiting aspects of the exemplary system and method and/or any examples to use with carbon dioxide only. Instead, aspects of the exemplary system and method can be used with any suitable gas.

In one example, the charged adsorbent is a zeolite such as analcime, chabazite, clinoptilolite, heulandite, natrolite, phillipsite, or stilbite. The zeolite can be naturally occurring or synthetic, and can be capable of holding up to about 18% carbon dioxide by weight or more. The zeolite material can be arranged in any suitable form, such as a solid block (e.g., in disc form), particles of spherical, cubic, irregular or other suitable shape, and others. An arrangement that allows the zeolite to flow or be flowable (e.g., as spherical particles), can be useful for packaging the zeolite in individual containers. Such an arrangement can allow the zeolite to flow from a hopper into a container, for example, simplifying the manufacturing process. The surface area of the zeolite particles can also be arranged to help control the rate at which the zeolite releases carbon dioxide gas, since higher surface area measurements typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

The carbon dioxide-activating fluid supply in this example includes a conduit that is fluidly coupled to the pump 1313 and the valve 1351$c$ that can be controlled to open/close or otherwise control the flow of precursor liquid into the upper vessel. That is, a single pump can be arranged to both deliver precursor liquid to the carbonation tank and deliver activating fluid to a gas source. Other arrangements or additions are possible for the carbon dioxide-activating fluid supply, such as a dedicated liquid supply for the upper vessel that is separate from the precursor liquid supply, a pressure-reducing element in the conduit, a flow-restrictor in the conduit, a flow meter to indicate an amount and/or flow rate of fluid into the vessel, a syringe, piston pump or other positive displacement device that can meter desired amounts of liquid (whether water, citric acid or other material) to the vessel, and others. In another example, the activating fluid supply can include a gravity-fed liquid supply that has a controllable delivery rate (e.g., like the drip-type liquid supply systems used with intravenous lines for providing liquids to hospital patients), or it can spray atomized water or other liquid to provide a water vapor or other gas phase activating fluid to the upper vessel.

A carbon dioxide gas supply can be arranged to provide carbon dioxide gas from the upper vessel to an area where the gas is used to carbonate the liquid, in this case, the carbonation tank 1306. The gas supply can be arranged in any suitable way, and this illustrative example includes a conduit that is fluidly connected between the upper vessel and a carbonated liquid outlet of the carbonation tank 1306. A gas control valve 1351$d$ is controllable by the control circuit to open and close the flow path through the gas supply conduit. (Note that in some examples, the gas control valve 1351$d$ can be a check valve that is not controllable by the control circuit.)

The gas supply can include other components other than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. The use of an accumulator or similar gas storage device can obviate the need to control the rate of gas output by a container. Instead, the gas source can be permitted to emit gas in an uncontrolled manner, with the emitted gas being stored in an accumulator for later delivery and use in producing a sparkling beverage. Gas released from the accumulator could be released in a controlled manner (e.g., at a controlled pressure and/or flow rate.) Also, carbonation of the precursor liquid can occur via one or more mechanisms or processes, and thus is not limited to one particular process. For example, while delivery of carbon dioxide gas to the outlet of the carbonation tank 1306 can function to help dissolve carbon dioxide in the liquid, other system components can further aid in the carbonation process. In some examples, a sparger can be used to introduce gas into the carbonation tank, precursor liquid can be circulated in the tank, and/or other techniques can be used to alter a rate at which carbonating gas is dissolved.

Before, during and/or after carbonation of the liquid in the carbonation tank 1306, a system 1307 can chill the liquid. As noted above, the cooling system 1307 can operate in any suitable way (e.g., can include ice, refrigeration coils or other cooling elements in thermal contact with the carbonation tank 1306). In addition, the carbonation tank 1306 can include a mixer or other agitator to move the liquid in the carbonation tank 1306 to enhance gas dissolution and/or cooling. Operation in forming a beverage can continue for a preset amount of time, or based on other conditions, such as a detected level of carbonation, a drop in gas production by the upper vessel, or other parameters. During operation, the amount of liquid provided to the upper vessel can be controlled to control gas output. Control of the liquid provided to the upper vessel can be accomplished based on a timing sequence (e.g., the valve 1351$c$ can be opened for a period of time, followed by valve closure for a period, and so on), based on detected pressure (e.g., liquid supply can be stopped when the pressure in the carbonation tank 1306 exceeds a threshold, and resume when the pressure falls below the threshold or another value), based on a volume of activating liquid delivered to the upper vessel (e.g., a specific volume of liquid can be delivered to the vessel in one or more discrete volumes), or other arrangements.

With the precursor liquid in the carbonation tank 1306 ready for dispensing, the vent valve 1351$b$ can be opened to reduce the pressure in the carbonation tank 1306 to an ambient pressure. As is known in the art, depressurizing the carbonation tank prior to dispensing can aid in maintaining a desired carbonation level of the liquid during dispensing. With the carbonation tank 1306 vented, the vent valve 1351$b$ can be closed and a pump vent valve 1351$a$ can be opened. The pump 1313 can then be operated to draw air or other gas into the inlet side of the pump 1313 and pump the gas into the carbonation tank 1306 so as to force the precursor liquid in the carbonation tank 1306 to flow into the dispense line

1338. While the pump 1313 delivers air to the carbonation tank, the dispense valve 1351e is opened and the gas control valve 1351d is closed during liquid dispensing. The dispensed liquid can enter a mixing chamber 1309 at which the carbonated liquid and beverage material provided from the lower vessel of the container 1310 are combined. The beverage material can be moved out of the vessel and to the mixing chamber 1309 by introducing pressurized gas into the vessel (e.g., by way of an air pump 1343).

The control circuit can use one or more sensors to control a carbonation level of the precursor liquid, a temperature to which the liquid is chilled (if at all), a time at which and during which beverage material is delivered to the mixing chamber 1309, a rate at which carbonating gas is produced and delivered to the carbonation tank 1306, and/or other aspects of the beverage making process. For example, a temperature sensor can detect the temperature of the precursor liquid in the carbonation tank 1306. This information can be used to control system operation (e.g., warmer precursor liquid temperatures can cause the control circuit to increase an amount of time allowed for carbon dioxide gas to be dissolved in the precursor liquid). In other arrangements, the temperature of the precursor liquid can be used to determine whether the system 1300 will be operated to carbonate the liquid or not. For example, in some arrangements, the user can be required to add suitably cold liquid (and/or ice) to the reservoir 1311 before the system 1300 will operate. (As discussed above, relatively warm precursor liquid temperatures can cause the liquid to be insufficiently carbonated in some conditions.)

In another example, a pressure sensor can be used to detect a pressure in the carbonation tank 1306. This information can be used to determine whether the carbonation tank 1306 is properly or improperly filled, if a pressure leak is present, if carbonation is complete and/or to determine whether sufficient carbon dioxide gas is being produced by the upper vessel 1315. For example, low detected pressure can indicate that more carbon dioxide needs to be generated, and thus cause the control circuit to allow more liquid to be delivered by the activating fluid supply to the upper vessel. Likewise, high pressures can cause the flow of liquid from the activating fluid supply to be slowed or stopped. Thus, the control circuit can control the gas pressure in the carbonation tank 1306 and/or other areas of the system 1300 by controlling an amount of liquid delivered to the upper vessel.

Alternately, low pressure can indicate that there is a leak in the system and cause the system to indicate an error is present. In some examples, measured pressure can indicate that carbonation is complete. For example, pressure in the carbonation tank 1306 can initially be detected to be at a high level, e.g., around 70-80 psi, and later be detected to be at a low level (e.g., around 40 psi), due to gas being dissolved in the liquid. The low pressure detection can indicate that carbonation is complete.

The control circuit can also be arranged to allow a user to define a level of carbonation (i.e., amount of dissolved gas in the beverage, whether carbon dioxide or other). For example, the control circuit can include a touch screen display or other user interface that allows the user to define a desired carbonation level, such as by allowing the user to select a carbonation volume level of 1, 2, 3, 4, or 5, or selecting one of a low-, medium- or high-carbonation level. Containers used by the system 1300 can include sufficient gas source material to make the highest level of carbonation selectable, but the control circuit can control the system to dissolve an amount of gas in the beverage that is consistent with the selected level. For example, while all containers can be arranged for use in creating a "high" carbonation beverage, the control circuit can operate the system 1300 to use less of the available gas (or cause the gas source to emit less gas than possible) in carbonating the beverage. Carbonation levels can be controlled based on a detected carbonation level by a sensor, a detected pressure in the carbonation tank 1306 or elsewhere, an amount of gas output by the container 10, or other features.

In another example, the container 1310 can include indicia readable by the controller (e.g., a RFID tag, barcode, alphanumeric string, etc.), that indicates a carbonation level to be used for the beverage. After determining the carbonation level from the container 10, the control circuit can control the system 1300 accordingly. Thus, a user need not select the carbonation level by interacting with the system 1300, but rather a carbonation level can be automatically adjusted based on the container selected. In yet another example, a user can be able to select a container with a gas source vessel that matches a carbonation level the user desires. (Different carbonation levels can be provided in the different containers by having different amounts of gas source in the vessel.) For example, container 1310 can exist in a variety of levels—providing low-, medium- and high-carbonation levels—available for selection by a user, and the user can pick the container 1310 that matches the desired carbonation level, and provide the selected container to the system. Thus, a gas source vessel labeled "low" can be chosen and used with the system to create a low level carbonated beverage.

A user can alternately be permitted to define characteristics of a beverage to be made by interacting in some way with a container to be used by the system 1300. For example, tab, notch, or other physical feature of the container 1310 can be altered or formed by the user to signify a desired beverage characteristic. For example, a broken tab, slider indicator, a covered or uncovered perforation on a portion of the container 1310, etc., that is created by the user can indicate a desired carbonation level, an amount of beverage material to use in forming the beverage (where the system 1300 is controllable to use less than all of the beverage material in the container to form a beverage), and so on. Features in the container 1310 can also be used by the control circuit to detect features of the container 1310, a beverage being formed or other components of the system 1300.

The container 1310 can be made of any suitable materials, and is not necessarily limited to the constructions shown herein. For example, the container 1310 can be made of, or otherwise include, materials that provide a barrier to moisture and/or gases, such as oxygen, water vapor, etc. In one example, the container 1310 can be made of a polymer laminate (e.g., formed from a sheet including a layer of polystyrene, polypropylene and/or a layer of EVOH and/or other barrier material), such as a metallic foil. In one example, the container 1310 is injection molded. Moreover, the container 1310 materials and/or construction can vary according to the materials contained in the container 1310. For example, a portion of the container 1310 containing a gas source material can require a robust moisture barrier, whereas a beverage material portion may not require such a high moisture resistance. Thus, the containers can be made of different materials and/or in different ways. In addition, the container 1310 interior can be differently constructed according to a desired function. Thus, as used herein, a "container" can take any suitable form, such as a pod (e.g., opposed layers of filter paper encapsulating a material), capsule, sachet, package, or any other arrangement. The container 1310 can have a defined shape, or can have no defined shape (as is the case with some sachets or other packages made entirely of flexible material). The container can be impervious to air and/or liquid, or can allow water and/or air to pass into the container.

In accordance with one aspect of the exemplary system and method, the container includes an indicator that is readable by a beverage making system or other indicator reader. As non-limiting, illustrative examples, the indicator can be an RFID tag, barcode, alphanumeric string, taggant, taggant ink, or other suitable indicator. The indicator can be used to provide any suitable information to the beverage making system or to another reader. For example, the indicator can inform the beverage making system of the type of contents contained within the container such as a specific flavor, volume, gas-only or beverage material-only, which can cause the beverage making system to perform an operation that is suitable for such contents. In some examples, the indicator can provide product authentication, expiration information, and/or manufacturing information such as lot number and manufacturing facility.

Figure 14:
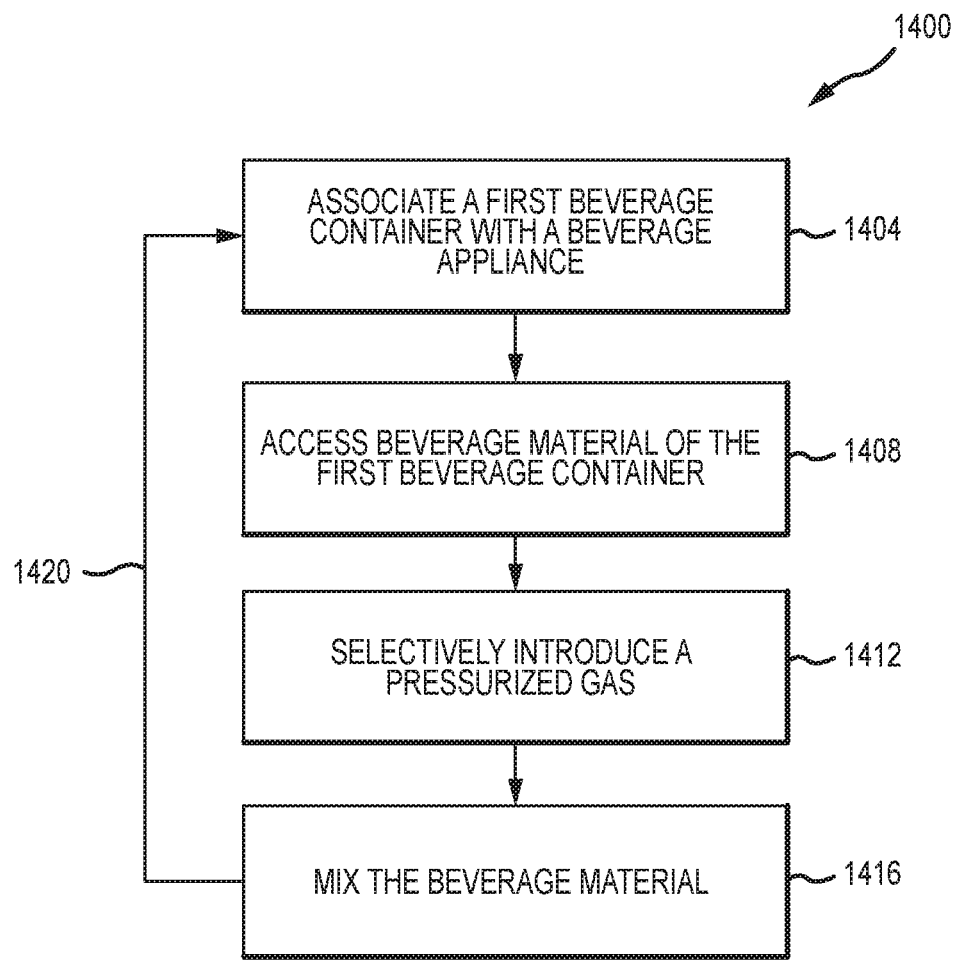
FIG. 14 depicts a flow diagram for producing multiple beverages.

To facilitate the reader's understanding of the various functionalities of the examples discussed herein, reference is now made to the flow diagram in FIG. 14, which illustrates process 1400. While specific steps (and order of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 14, process 1400 relates generally to a method for producing beverages from multiple beverage containers. Each of the multiple beverage containers has a beverage material. The process 1400 can be used with any of the beverage appliances and beverage containers described herein, for example, such as the beverage appliances 104, 200 and/or beverage containers 150, 304 and variations and combinations thereof.

At operation 1404, a first beverage container of the multiple beverage containers is associated with a beverage appliance. For example and with reference to FIG. 7, the beverage container 304 is associated with the beverage appliance 200. The beverage container 304 includes the beverage material 302 which can be used by the beverage appliance 200 in order to form a beverage. This can be a beverage with any of a range of carbonation levels, from a substantially non-carbonated beverage to a substantially high-carbonation beverage.

At operation 1408, a beverage material of the first beverage container is accessed. For example and with reference to FIGS. 7 and 8, the anvil 802 of the beverage appliance 200 is advanced substantially toward the beverage container 304. The movement of the anvil 802 can cause the moveable portion 328 of the beverage container 304 to advance toward the membrane 352 within the beverage container 304. The moveable portion 328 can include the piercing feature 364. As such, the piercing feature 364 moves at least partially through the membrane 352 and allows for release of the beverage material 302.

At operation 1412, a pressurized gas is selectively introduced into a chilled precursor supply. For example and with reference to FIGS. 1C and 13, the pressurized gas supply 116 is selectively introduced into the precursor supply 112. The pressurized gas supply 116 can be introduced into the precursor supply 112 at least partially based on a carbonation level of the target beverage produced by the beverage appliance 200. For example, where the target beverage is a substantially non-carbonated beverage, the pressurized gas supply 116 can be shielded from the precursor supply 112. And where the target beverage has a substantially high-carbonation level, the pressurized gas supply 116 is introduced to the precursor supply 112 at an elevated level.

At operation 1416, the beverage material is mixed with the chilled precursor supply, thereby producing a first beverages. For example and with reference to FIGS. 10-12, the dispensing assembly 1002 can combine both a precursor supply and the beverage material in order to form a target beverage. The precursor supply can be chilled to a specified temperature, as described herein.

At operation 1420, the operations 1404-1416 can be repeated for a second beverage container of the multiple beverage containers. For example and with reference to FIGS. 7 and 8, the beverage container 304 can be a second beverage container of a group of beverage containers. The second beverage container can have a beverage material that is distinct from the beverage material of the first beverage container. For example, the first beverage container can include beverage material for use in producing a substantially non-carbonated beverage, whereas the second beverage container can include beverage material for use in producing a substantially high-carbonation beverage, such as a high-carbonation content beer.

The substantially high-carbonation content beer can be produced using the operations 1404-1416 described herein. In this regard, at operation 1412 the pressurized gas supplied to the precursor supply can be increased. As such, the carbonation content of the resulting second target beverage can also be increased. In some cases, the carbonation content of the second beverage can be at least double the carbonation content of the first beverage. Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A beverage system comprising:
   a beverage container having an internal space with a beverage material sealed therein, the beverage container configured to shield the beverage material from light ingress, wherein the beverage container comprises an enclosure including a piercing feature defined by an elongated protrusion having a sharp end portion disposed within the enclosure, the piercing feature defining a first passage comprising a recess disposed on an outer surface of the piercing feature configured to direct a supply of gas to the internal space and the piercing feature further defining a second passage defined through a body of the piercing feature, the beverage material configured to flow from the internal space through the second passage; and a beverage appliance configured to receive the beverage container and produce a beverage from the beverage material, the beverage appliance comprising a chilled precursor supply and a dispensing assembly, the dispensing assembly defining a first outlet fluidically coupled with the beverage material and a second outlet adjacent the first outlet and fluidically coupled with the chilled precursor supply, wherein the beverage appliance further comprises a pressurized gas supply selectively combinable with the beverage material to produce the beverage as one of a carbonated beverage or a non-carbonated beverage.

2. The beverage system of claim 1, wherein:
the beverage produced by the beverage appliance has a target carbonation level of 0 volume of $CO_2$ for the non-carbonated beverage and up to 5 volumes of $CO_2$ for the carbonated beverage; and
the beverage appliance is configured to introduce a pressurized gas into the chilled precursor supply based on the target carbonation level.

3. The beverage system of claim 1, wherein:
the first outlet and the second outlet cooperate to combine the beverage material and the chilled precursor supply downstream of a dispensing end of the dispensing assembly.

4. The beverage system of claim 3, wherein a portion of the dispensing end is configured to contact an end-use beverage receptacle.

5. The beverage system of claim 3, wherein the first outlet and the second outlet are arranged to form:
an internal stream of the beverage material; and
an annular stream of the chilled precursor supply surrounding the internal stream.

6. The beverage system of claim 1, wherein:
the beverage appliance further comprises a cooling system; and
the chilled precursor supply is maintained at a temperature below an ambient temperature by the cooling system, the cooling system comprising at least one of a fan, a heat sink, heat pipes, or a thermoelectric device.

7. The beverage system of claim 1, wherein the beverage container comprises an opaque layer surrounding the beverage material.

8. The beverage system of claim 7, wherein the opaque layer is adapted to block light ingress into the beverage container for light waves within a range of 300 nm to 500 nm.

9. The beverage system of claim 1, wherein the beverage container comprises an oxygen seal adapted to seal the beverage material therein over a period of at least 6 months, of at least 1 year, of at least 2 years, or of at least 5 years.

10. The beverage system of claim 9, wherein the oxygen seal is adapted to maintain a pressure differential of up to 40 psi between an internal space of the beverage container and an external environment during the period.

11. The beverage system of claim 10, wherein the oxygen seal is adapted to limit oxygen ingress into the internal space during the period to 1 to 2 ppb of oxygen per day.

12. The beverage system of claim 11, wherein the oxygen seal operates to limit a cumulative oxygen ingress value to less than 180 ppb of oxygen.

13. A beverage system comprising:
a beverage container having a sealed region encompassing a beverage material within a pressurized internal space, the sealed region configured to maintain the beverage material in the pressurized internal space in response to exposure to direct sunlight; and
a beverage appliance configured to receive the beverage container and produce a non-carbonated beverage or a carbonated beverage from the beverage material, the beverage appliance comprising a precursor supply and a cooling system, the cooling system comprising at least one of a fan, a heat sink, heat pipes, or a thermoelectric device configured to remove heat from the precursor supply and maintain the precursor supply above a freezing temperature;
the beverage container comprises an enclosure that fits over a membrane, wherein the enclosure includes a piercing feature defined by an elongated protrusion having a sharp end portion disposed in the elongated protrusion and the beverage appliance comprising an anvil that causes the piercing feature to penetrate the membrane to release the beverage material, the piercing feature comprising an inlet path and an outlet path, the inlet path comprising a recess disposed on an outer surface of the piercing feature configured to direct a supply of gas to the pressurized internal space, and the outlet path defined through a body of the piercing feature configured to direct the beverage material from the pressurized internal space.

14. The beverage system of claim 13, wherein the beverage appliance further comprises:
a pressurized gas supply fluidically coupled with the precursor supply; and
a dispensing assembly configured to combine the precursor supply and the beverage material, thereby forming the carbonated beverage.

15. The beverage system of claim 14, wherein the beverage appliance is configured to:
in response to a receipt of the beverage container having the beverage material for the carbonated beverage, carbonate the precursor supply with the pressurized gas supply.

16. The beverage system of claim 14, wherein:
the dispensing assembly comprises:
a dispensing end having a first outlet fluidically coupled with the beverage material; and
a wall defining an annular second outlet around the dispensing end, the annular second outlet fluidically coupled with the precursor supply; and
the dispensing end extending away from the wall and configured for engagement with an end-use beverage receptacle.

17. The beverage system of claim 13, wherein:
the cooling system comprises a sensor configured to detect a parameter of the precursor supply; and
the at least one of the fan, the heat sink, heat pipes, or the thermoelectric device is further configured to remove heat from the precursor supply when the parameter satisfies a threshold condition.

18. The beverage system of claim 13, wherein the beverage container has a burst resistance of up to 40 psi.

19. The beverage system of claim 13, wherein the beverage container includes an opaque barrier layer configured to impede the direct sunlight that is within a range of 350 nm to 500 nm from reaching the beverage material.

* * * * *